(12) United States Patent
Yamauchi et al.

(10) Patent No.: US 7,442,141 B2
(45) Date of Patent: Oct. 28, 2008

(54) TRANSMISSION

(75) Inventors: Yasuhiro Yamauchi, Yokohama (JP);
Katsunori Asogawa, Yokosuka (JP);
Toshikazu Oshidari, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 282 days.

(21) Appl. No.: 11/405,367

(22) Filed: Apr. 17, 2006

(65) Prior Publication Data

US 2006/0247081 A1    Nov. 2, 2006

(30) Foreign Application Priority Data

Apr. 18, 2005   (JP)   ............................. 2005-119480

(51) Int. Cl.
*F16H 3/72*   (2006.01)
(52) U.S. Cl. .......................................... 475/6
(58) Field of Classification Search ...................... 475/5, 475/6
See application file for complete search history.

(56) References Cited

U.S. PATENT DOCUMENTS 6,491,599 B1 *  12/2002  Schmidt ......................... 475/5
7,309,300 B2 *  12/2007  Garnett et al. ................. 475/18
7,347,799 B2 *   3/2008  Manfredotti et al. ........... 475/6

FOREIGN PATENT DOCUMENTS

| JP | 08-042656 | 2/1996 |
| JP | 08-282314 | 10/1996 |
| JP | 11-240347 | 9/1999 |

* cited by examiner

Primary Examiner—Dirk Wright
(74) Attorney, Agent, or Firm—Global IP Counselors, LLP

(57) ABSTRACT

In an exemplary embodiment, a transmission outputs power from two high-speed, high-powered motor/generators into two coaxial output shafts for left and right wheels of a vehicle. Embodiments of the invention provide for a transmission that is coaxially mounted with the output shafts and the two motor/generators, which allows for a space-saving design. The transmission provides at least two degrees of freedom such that torque to each of the left any right wheels of driveshaft can be separately controlled by controlling the input/output of each of the motor/generators. The transmission may include two differential units to allow a significant gear reduction such that motor/generators that require high output speeds may be used.

21 Claims, 32 Drawing Sheets

| INPUT / OUTPUT | MG1 (TORQUE = Tmg1) | MG2 (TORQUE = Tmg2) |
|---|---|---|
| Out1 (THE NUMBER OF REVOLUTIONS = Nout1) $T_{out1} = (1+\alpha)T_{mg1} + \beta T_{mg2}$ | $(1+\alpha)$ | $\beta$ |
| Out2 (THE NUMBER OF REVOLUTIONS = Nout2) $T_{out2} = \alpha\gamma T_{mg1} + (1+\beta)\gamma T_{mg2}$ | $\alpha\gamma$ | $(1+\beta)\gamma$ |

Top row formulas:
- MG1: $N_{mg1} = (1+\alpha)N_{out1} + \alpha\gamma N_{out2}$
- MG2: $N_{mg2} = \beta N_{out1} + (1+\beta)\gamma N_{out2}$ HOWEVER $\begin{pmatrix} \alpha = L1/L2 \\ \beta = L3/L2 \\ \gamma = L4/L5 \end{pmatrix}$

FIG. 4

HOWEVER $\begin{pmatrix} \alpha = L1/L2 \\ \beta = L3/L2 \\ \gamma = L4/L5 \\ \epsilon = L6/L7 \end{pmatrix}$

| INPUT<br>OUTPUT | MG1(TORQUE = Tmg1)<br>Nmg1 = (1+α)(1+ε)Nout1 + αγ Nout2 | MG2(TORQUE = Tmg2)<br>Nmg2 = β(1+ε)Nout1 + (1+β)γNout2 |
|---|---|---|
| Out1(THE NUMBER OF REVOLUTIONS = Nmg1)<br>Tout1 = (1+α)(1+ε)Tmg1 + β(1+ε)Tmg2 | $(1+\alpha)(1+\epsilon)$ | $\beta(1+\epsilon)$ |
| Out2(THE NUMBER OF REVOLUTIONS = Nmg2)<br>Tout2 = αγ Tmg1 + (1+β)γ Tmg2 | $\alpha\gamma$ | $(1+\beta)\gamma$ |

FIG. 24

| INPUT / OUTPUT | MG1 (TORQUE = Nmg1) | MG2 (TORQUE = Nmg2) |
|---|---|---|
|  | $Nmg1 = \dfrac{1+\alpha+\epsilon}{1+\epsilon} Nout1$ $+ \dfrac{\alpha\gamma}{1+\epsilon} Nout2$ | $Nmg2 = (1+\beta) Nout1$ $+ 0 \cdot Nout2$ |
| Out1 (THE NUMBER OF REVOLUTIONS = Tout1) $Tout1 = \dfrac{1+\alpha+\epsilon}{1+\epsilon} Tmg1 + 0 \cdot Tmg2$ | $\dfrac{1+\alpha+\epsilon}{1+\epsilon}$ | 0 |
| Out2 (THE NUMBER OF REVOLUTIONS = Tout2) $Tout2 = \dfrac{\alpha\gamma}{1+\epsilon} Tmg1 + (1+\beta) Tmg2$ | $\dfrac{\alpha\gamma}{1+\epsilon}$ | $(1+\beta)$ |

HOWEVER $\begin{pmatrix} \alpha = L1/L2 \\ \beta = L6/L5 \\ \gamma = L5/L4 \\ \epsilon = L3/L2 \end{pmatrix}$

FIG. 32

TRANSMISSION

This application claims priority from Japanese Patent Application No. 2005-119480, filed Apr. 18, 2005, the entire content of which is incorporated herein by reference.

TECHNICAL FIELD

The invention relates to a transmission and more particularly, but without limitation to a transmission for an electric or hybrid vehicle.

BACKGROUND

A hybrid four-wheel-drive vehicle may have either the front or rear wheels driven by an engine, and the other wheels driven by a motor. Some hybrid vehicles provide a motor/generator connected to the front or rear wheels to drive these wheels by turning on the motor when necessary, or conversely, capturing rotational energy of these wheels by converting the rotational energy to electric energy to be stored, e.g., during braking. However, general practice requires that the power distribution to the wheels from the motor/generator is performed after reducing the rotational velocity of the motor/generator using a two-step parallel gear reducer. However, a transmission with a two-step parallel gear reducer causes the motor to be offset radially from an axis of a driveshaft. This results in a radially large drive system including the motor, which limits the practical application of such a design.

It has been proposed to provide an electrical motor in a coaxial arrangement with a rotational axis of wheels in order to conserve space by creating a hollow space at the center of the electrical motor through which a driveshaft can be located.

SUMMARY

With a transmission in which one planetary gear group is used, the problem of a radially enlarging wheel-drive system, including the motor, may be avoided by coaxially. locating the planetary gear group and the motor, but there is a structural restriction in increasing the reduction ratio, making it difficult for use in cases in which a high-power motor that is rotatable at high speed is required.

Additionally, with a differential unit comprising a planetary gear group when the motor power is distributed into a dual-output system, the torque distribution to the dual-output system may be fixed based on the design of the differential unit, so it is not adoptable when the torque distribution to a dual-output system needs to be freely controlled.

Embodiments of the invention may provide a transmission capable of outputting the rotation from a motor at a reduced rotational velocity, even with a high-power motor must rotate at high speed. Such a transmission may also be capable of freely controlling the torque distribution to a dual-output system.

In an embodiment of the invention, a transmission comprises a first differential unit comprising a first set of rotary elements, wherein the first set of rotary elements includes at least three rotary elements, a second differential unit comprising a second set of rotary elements, wherein the second set of rotary elements includes at least three rotary elements, wherein at least one rotary element in the first set of rotary elements is connected to at least one rotary element in the second set of rotary elements, wherein the first differential unit combines with the second differential unit to provide at least two degrees of freedom for the transmission, a first motor/generator connected to a first rotary element, wherein the first rotary element is one of the first set of rotary elements, a first output shaft connected to a second rotary element, wherein the second rotary element is one of the first set of rotary elements, a second motor/generator connected to a third rotary element, wherein the third rotary element is one of the second set of rotary elements, and a second output shaft connected to a fourth rotary element, wherein the fourth rotary element is one of the second set of rotary elements or one of the first set of rotary elements.

In one embodiment, a transmission comprises a first differential unit comprising a first set of rotary elements, wherein the first set of rotary elements includes at least three rotary elements, a second differential unit comprising a second set of rotary elements, wherein the second set of rotary elements includes at least three rotary elements, wherein at least one rotary element in the first set of rotary elements is connected to at least one rotary element in the second set of rotary elements, wherein the first differential unit combines with the second differential unit to provide at least two degrees of freedom for the transmission, a first motor/generator connected to a first rotary element, wherein the first rotary element is one of the first set of rotary elements, a gear reduction mechanism, a first output shaft connected to a second rotary element through the gear reduction mechanism, wherein the second rotary element is one of the first set of rotary elements, a second motor/generator connected to a third rotary element, and a second output shaft connected to a fourth rotary element.

An embodiment of the invention is directed to a transmission comprising a first differential unit comprising a first planetary gear group and a second planetary gear group, wherein the first and second planetary gear groups have a first common carrier and together include five rotary elements, a second differential unit comprising a third planetary gear group and a fourth planetary gear group, wherein the third and fourth planetary gear groups have a second common carrier and together include five rotary elements, wherein at least one rotary element in the first differential unit is connected to at least one rotary element in the second differential unit, wherein the first differential unit combines with the second differential unit to provide at least two degrees of freedom for the transmission, a first motor/generator, a first output shaft, a second motor/generator; and a second output shaft, wherein, in a first alignment chart, which represents the first differential unit, a first rotary element of the first differential unit, which is connected to the first motor/generator, is on a first end of the alignment chart in the direction of the order of the rotational speeds, a second rotary element of the first differential unit, which is connected to a second rotary element of the second differential unit, is on the end of the first alignment chart opposite to the first end of the first alignment chart, and the first common carrier of the first differential unit is located between the first rotary element of the first differential unit and the second rotary element of the first differential unit on the first alignment chart, wherein the first output shaft is connected to the first common carrier or to a rotary element of the first differential unit immediately adjacent to the first common carrier on the alignment chart, wherein, in a second alignment chart, which represents the second differential unit, a first rotary element of the second differential unit, which is connected to the second motor/generator, is on a first end of the second alignment chart in the direction of the order of the rotational speeds, the second rotary element of the second differential unit is on the end of the second alignment chart opposite to the first end of the second alignment chart, the second common carrier, is located between the first rotary element of the second differential unit and the second rotary element of the second differential unit on the second alignment chart, a third rotary element of the second differential unit, which is connected to the second output shaft, is located adjacent to the second common carrier on the second alignment chart, and a fourth rotary element of the second differential unit, which is fixed, is located between the second common carrier and the second rotary element of the second differential unit.

In an embodiment, a transmission comprises a first differential unit comprising at least a first rotary element, a second rotary element and a third rotary element, a second differential unit comprising at least a fourth rotary element, a fifth rotary element and a sixth rotary element, wherein the sixth rotary element of the second differential unit is fixed, wherein the second differential unit is located coaxially with the first differential unit, wherein the first rotary element of the first differential unit is connected to the fourth rotary element of the second differential unit, a first motor/generator, wherein the first motor/generator is connected to the second rotary element of the first differential unit, a first output shaft, wherein the first output shaft is connected to the third rotary element of the first differential unit, a second output shaft, wherein the second output shaft is connected to the fifth rotary element of the second differential unit, wherein the second output shaft is located coaxially with the first output shaft, and a second motor/generator, wherein the second motor/generator is connected to a rotary element of the second differential unit other than the fifth rotary element of the second differential unit or the sixth rotary element of the second differential unit.

According to the transmission associated with the present invention, the connections among the rotary elements of these differential units, and the connections of both motor/generators as well as both output shafts to these rotary elements are the connections described above, so that the rotation of both motor/generators is distributed and output to both output shafts under the deceleration by both differential units, and both motor/generators are able to be placed coaxially to both differential units that have been coaxially located in parallel. This avoids the problem of radially enlarging the transmission including the motor.

Because the rotation of both motor/generators is distributed and output to both output shafts while the rotation is being reduced by both differential units, a large reduction ratio may be set according to the combination of both differential units, so even when a high-power motor that is rotatable only at high speed is used, the rotation from said motors is output, assuring a reduction in the required number of revolutions, so it is also applicable to a system in which such a high-power motor is used without any problem or restriction in use.

Because the rotation of both motor/generators is distributed and output to both output shafts while the rotation is being reduced by both differential units, the torque distribution to both output shafts becomes freely controllable according to the output combination of both motor/generators, so it is also applicable to cases in which the torque distribution to a dual-output system needs to be freely controlled without any restriction in use.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is an explanatory figure showing the coefficients between the input/output of the transmission in the same embodiment.

FIG. 24 is an explanatory figure showing the coefficients between the input/output of the transmission in the same embodiment.

FIG. 32 is an explanatory figure showing the coefficients between the input/output of the transmission in the same embodiment.

DETAILED DESCRIPTION

Figure 1:
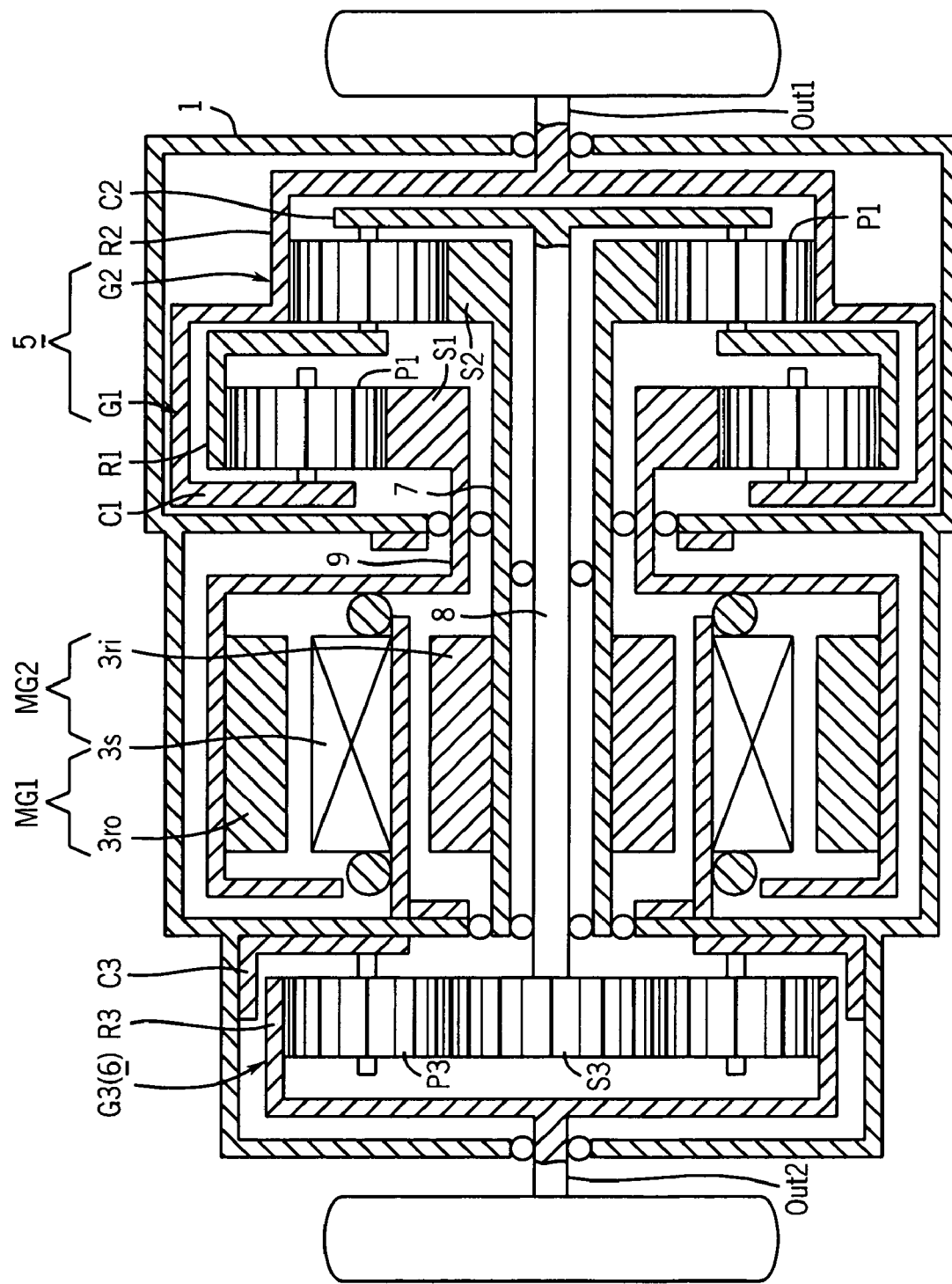
FIG. 1 is an outline drawing showing a concept of a transmission in one embodiment of the present invention.

FIG. 1 is an outline drawing illustrating a transmission as an embodiment of the present invention. In FIG. 1, 1 represents the casing, within the same casing 1 axially on the right side (left/right direction in the figure), two—i.e. a first and a second—planetary gear groups G1 and G2 are coaxially accommodated in parallel, and within the casing 1 axially on the left side (left/right direction in the figure), a third planetary gear group G3 is accommodated so as to be coaxially located by the planetary gear groups G1 and G2.

First and second planetary gear groups G1 and G2 are located so as to position the first planetary gear group G1 on the left side in the figure, and one motor/generator MG1 and the other motor/generator MG2 are interposed coaxially between the first/second planetary gear groups G1 and G2 and the third planetary gear group G3. The motor/generators MG1 and MG2 have a common stator 3s fixed onto the casing 1, and are equipped with a rotor 3ro of one motor/generator MG1 located on the outer circumference and a rotor 3ri of the other motor/generator MG2 located on the inner circumference. The motor/generator MG1 is comprised of a stator 3s and an outside rotor 3ro, the motor/generator MG2 is comprised of a stator 3s and an inside rotor 3ri, and the motor/generator MG1 and MG2 serve as a composite current dual-layer motor.

In this case, by applying a composite current combining the control current of both motor/generators MG1 and MG2, the motor/generators MG1 and MG2 may be subject to individual motor drive control, or these motor/generators MG1 and MG2 may be functional as individual generators, respectively. Instead of comprising the motor/generators MG1 and MG2 as a single unit to serve as a composite current dual-layer motor, it may also be comprised as an independent unit having an individual stator. However, in any case, the motor/generators MG1 and MG2 are to be coaxially located together, and at the same time, be located coaxially with the planetary gear groups G1, G2, G3.

A first planetary gear group G1 and a second planetary gear group G2 constitute one differential unit 5, a third planetary gear group G3 constitute the other differential unit 6 in the present invention, and these first planetary gear group G1, second planetary gear group G2, and the third planetary gear group G3, respectively, are regarded as a single-pinion planetary gear group comprising a sun gear S1, S2, S3, a ring gear R1 and R2, R3, and a carrier C1 and C2, C3 rotatably supporting a pinion P1 and P2, P3 that engages with the sun gear and the ring gear. Herein, to construct one differential unit 5 from the first planetary gear group G1 and the second planetary gear group G2, the carrier C1 of the first planetary gear group G1 is connected to the ring gear R2 of the second planetary gear group G2, and at the same time, the ring gear R1 of the first planetary gear group G1 is connected to the carrier C2 of the second planetary gear group G2.

Then the ring gear R2 of the second planetary gear group G2 is connected to one output shaft Out1, and the carrier C2 of the second planetary gear group G2 is connected to the sun gear S3 of the third planetary gear group G3. One motor/generator MG1 is connected to the sun gear S1 of the first planetary gear group G1, and the other motor/generator MG2 is connected to the sun gear S2 of the second planetary gear group G2. Moreover, the carrier C3 of the third planetary gear group G3 is fixed, and the ring gear R3 of the third planetary gear group G3 is connected to the other output shaft Out2. In addition, a shaft 7 connecting the sun gear S2 to the motor/generator MG2 is a hollow shaft, a shaft 8 connecting the carrier C2 to the sun gear S3 extends from the location of the second planetary gear group G2 to the location of the third planetary gear group G3, penetrating through the hollow shaft 7, and a shaft 9 connecting the sun gear S1 to the motor/generator MG1 is a hollow shaft rotatably coupled to the outer circumference of the hollow shaft 7.

One output shaft Out1 protruding coaxially and rotatably from the end (right end in FIG. 1) of the casing 1, where second planetary gear group G2 is located, is to be connected to a differential gear unit for rear left/right wheels or to a differential gear unit for front left/right wheels not illustrated herein. The other output shaft Out2 protruding coaxially and rotatably from the end (left end in FIG. 1) of the casing 1 opposite to the protruding side of the above one output shaft Out1 is connected, for example, to a differential gear unit for rear left/right wheels or a differential gear unit for front left/right wheels not illustrated herein.

Figure 2:
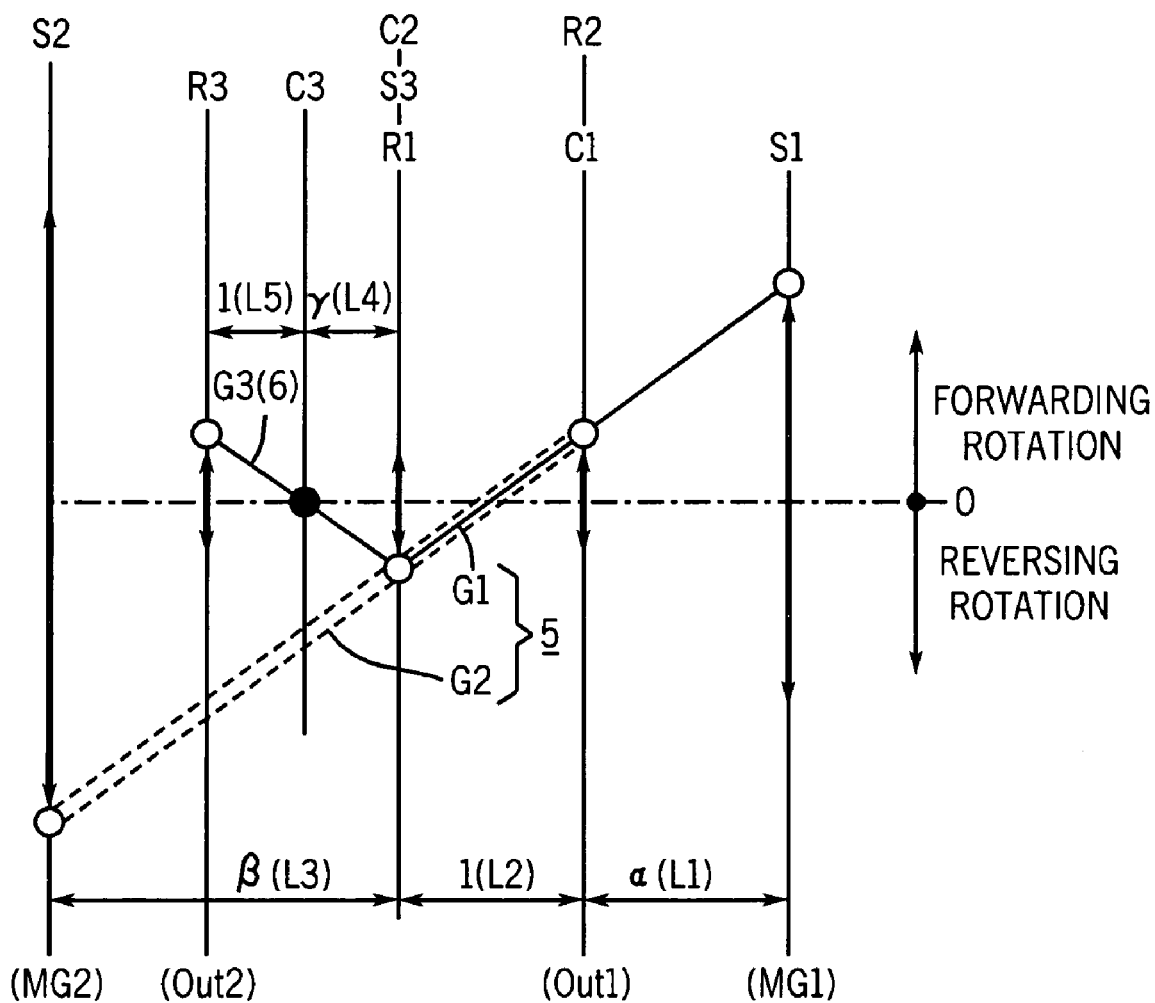
FIG. 2 is an alignment chart of a motor transmission in the same embodiment.

The above transmission unit comprised as in FIG. 1 can be represented as in FIG. 2 in an alignment chart; the vertical axis in the figure indicates the rotational speeds (0 is the reference, the upward direction in the figure is the forwarding rotational speed, and the downward direction is the reversing rotational speed) of the rotary elements constituting the planetary gear groups G1 and G2 (one differential unit 5) and the planetary gear group G3 (the other differential unit 6), the horizontal axis indicates the distance ratio between the rotary elements constituting the planetary gear groups G1 and G2 (one differential unit 5) and the planetary gear group G3 (the other differential unit 6). As described previously, the ring gear R1 and the carrier C2 are connected together, and the carrier C1 and the ring gear R2 are connected together, so one differential unit 5 comprising the first planetary gear group G1 and the second planetary gear group G2 is illustrated as a single rod of combined levers indicated by the same numerical mark G1 and G2 in FIG. 2, and the order of the rotational speeds (in ascending order or descending order, depending on the speed change status) of the rotary elements constituting the same differential unit 5 is in this order of sun gear S1, carrier C1 (ring gear R2), ring gear R1 (carrier C2), and sun gear S2.

The other differential unit 6 comprising the third planetary gear group G3 is represented as a lever indicated by the same numerical mark G3 in FIG. 2, as described because the sun gear S3 is connected to the ring gear R1 (carrier C2), and at the same time, the carrier C3 is fixed, and the order of the rotational speeds (in the ascending order or descending order, depending on the speed change status) of the rotary elements constituting the same differential unit 6 is in the order of sun gear S3, carrier C3, and ring gear R3.

In the alignment chart of FIG. 2, two rotary elements of one differential unit 5 (G1 and G2) located approximately in the middle in the direction of the order of the rotational speeds, or in other words, among the carrier C1 (ring gear R2) and the ring gear R1 (carrier C2), one output shaft Out1 is connected to the former carrier C1 (ring gear R2), and the later ring gear R1 (carrier C2) and the sun gear S3 of the other differential unit 6 (G3) are connected together. Two rotary elements of one differential unit 5 (G1 and G2) located at each end in the direction of the order of the rotational speeds in the alignment chart of FIG. 2, or in other words, among the sun gear S1 and the sun gear S2, one output shaft Out1 is connected to the sun gear S1, as a rotary element close to the carrier C1 (ring gear R2), and the sun gear S3 of the other differential unit 6 (G3) is connected to the sun gear S2, as a rotary element close to the ring gear R1 (carrier C2), one motor/generator MG1 and the other motor/generator MG2 are connected, respectively.

In the alignment chart of FIG. 2, the other output shaft Out2 is connected to the ring gear R3 of the other differential unit 6 (G3) located farthest from the sun gear S3 of the other differential unit 6 (G3) connected to the ring gear R1 (carrier C2) of one differential unit 5 (G1 and G2), and also in the same alignment chart of FIG. 2, the carrier R3 interposed between both ends of the other differential unit 6 (G3) is fixed onto the casing 1.

As for the transmission unit shown in FIG. 1, by changing the rotational speed of the motor/generators MG1 and MG2 within a range indicated by the bold arrows in the alignment chart of FIG. 2, a mutual connection point of one differential unit 5 (G1 and G2) and the other differential unit 6 (G3), and a connection point (carrier C1 and ring gear R2) of one output shaft Out1, a connection point of the other output shaft Out2 (ring gear R3) changes their rotational speed within the range indicated by the bold arrows, so the rotation of the motor/generators MG1 and MG2 may be distributed and output for both output shafts. Out1 and Out2.

Figure 3:
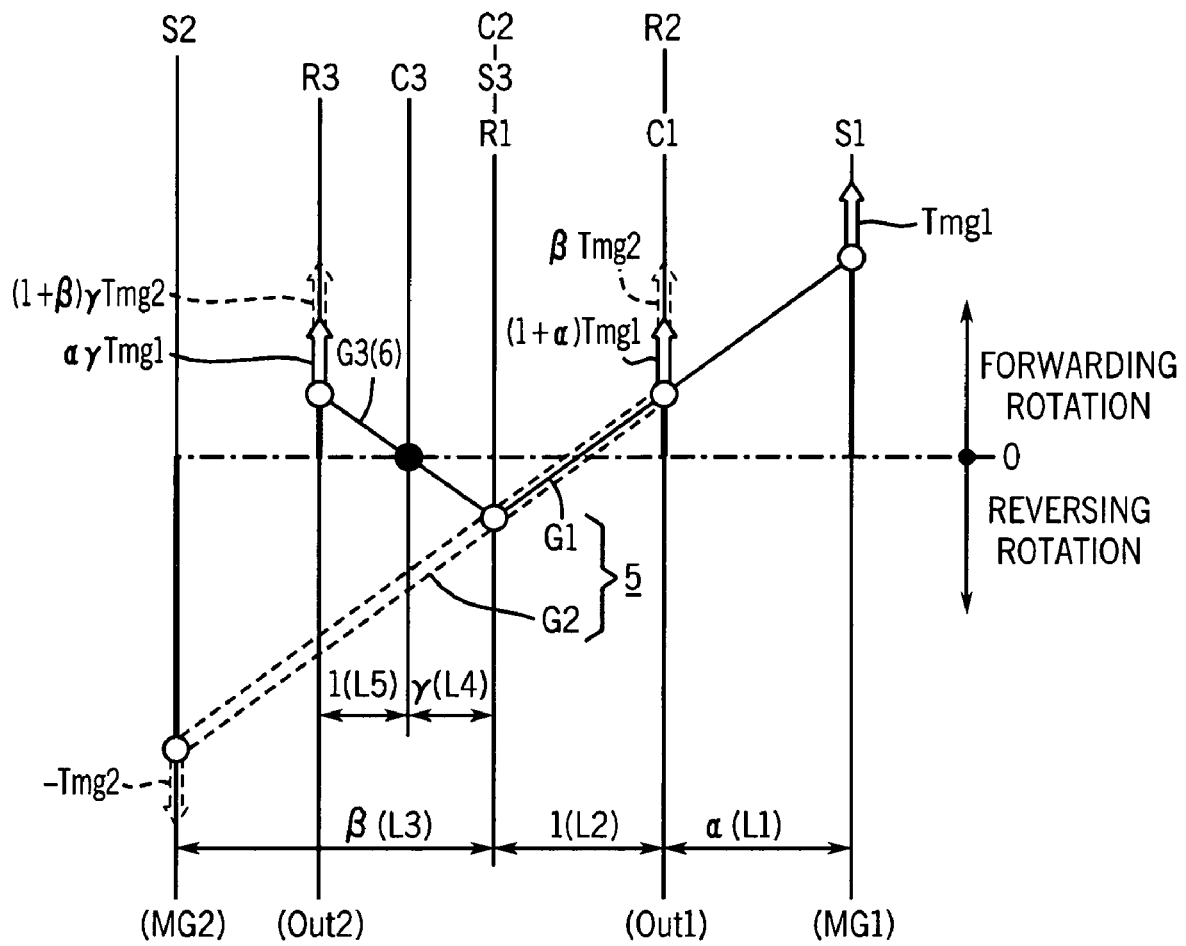
FIG. 3 is an alignment chart wherein vectors are added to the alignment chart in FIG. 2 for the explanation of behaviors of the transmission.

Hereafter, the manner in which the torque from the motor/generators MG1 and MG is transmitted to the output shafts Out1 and Out2 is explained based on the vector indicated in FIG. 3, which is the same alignment chart as FIG. 2. As shown in the alignment charts of FIG. 2 and FIG. 3, wherein L1 is the distance between the sun gear S1 connected to one motor/generator MG1 and the carrier C1 connected to one output shaft Out1, L2 is the distance between the carrier C1 to which one output shaft Out1 is connected and the ring gear R1 (carrier C2) that is a rotary element of the differential unit 5 connected to the differential unit 6, L3 is the distance between the ring gear R1 (carrier C2) and the sun gear S2 connected to the other motor/generator MG2, with regard to the other differential unit 6, L4 is the distance between the carrier C3 and the sun gear S3, L5 is the distance between the carrier C3 and the ring gear R3, and given $\alpha=L1/L2$, $\beta=L3/L2$, $\gamma=L4/L5$, when one motor/generator MG1 outputs positive torque Tmg1 as shown in FIG. 3, the positive torque $(1+\alpha)$Tmg1 is generated on one output shaft Out1, and positive torque $\alpha \cdot \gamma \cdot$Tmg1 is generated on the other output shaft Out2, when the other motor/generator MG2 outputs negative torque $-$Tmg2 as shown in FIG. 3, the positive torque $\beta \cdot$Tmg2 is generated on one output shaft Out1, and positive torque $(1+\beta)\gamma \cdot$Tmg2 is generated on the other output shaft Out2. Therefore, due to the torque Tmg1 and $-$Tmg2 of the motor/generators MG1 and MG2, positive torque $(1+\alpha)$Tmg1$+\beta \cdot$Tmg2 is applied to one output shaft Out1, and positive torque $\alpha \cdot \gamma \cdot$Tmg1$+(1+\beta)\gamma \cdot$Tmg2 is applied to the other output shaft Out2, so the same directional torque may be output from both output shafts Out1 and Out2.

FIG. 4 is an explanatory figure showing the relational coefficients during the above power transmission between the torque Tmg1 as well as the number of revolutions Nmg1 of the motor/generator MG1, and the torque Tout1 and Tout2 as well as the number of revolutions Nout1 and Nout2 of the output shafts Out1 and Out2, and between the torque Tmg2 as well as the number of revolutions Nmg2 of the motor/generator MG2, and the torque Tout1 and Tout2 as well as the number of revolutions Nout1 and Nout2 of the output shafts Out1 and Out2, and, in FIG. 4, the torque Tout1 and Tout2 generated from the output shafts Out1 and Out2 by the motor/generator torque Tmg1 and Tmg2, along with the number of revolutions Nmg1 and Nmg2 of the motor/generators MG1 and MG2 determined by the number of revolutions of the output shafts Nout1, Nout2 at that moment have also been stated.

Herein, when an equal value is given to the torque Tmg1 and Tmg2 of both motor/generators MG1 and MG2, for the purpose of explaining the conditions so that the torque Tout1 and Tout2 of both output shafts Out1 and Out2 are equalized, it is necessary to establish, $(1+\alpha)$Tmg1$+\beta \cdot$Tmg2$=\alpha \cdot \gamma \cdot$Tmg1$+(1+\beta)\gamma \cdot$Tmg2, but currently, Tmg1=Tmg2, so it may be acknowledged that the distance ratio $\alpha$, $\beta$, and $\gamma$, respectively, in said one differential unit 5 (G1 and G2) and in the other differential unit 6 (G3) must be determined so as to obtain $\alpha\gamma-(1+\alpha)\cong\beta-(1+\beta)\gamma$.

By determining the output of the motor/generators MG1 and MG2 so as to establish a relation of Tmg1·Nmg1+Tmg2·Nmg2+Tout1·Nout1+Tout2·Nout2=0 between the torque Tmg1 and Tmg2 as well as the number of revolutions Nmg1 and Nmg2 of the motor/generator MG1 and MG2, and the torque Tout1 and Tout2 as well as the number of revolutions Nout1 and Nout2 of the output shafts Out1 and Out2, the drive power distribution to both output shafts Out1 and Out2 becomes arbitrarily controllable, and thus may be used as the drive power distribution control of the front/rear wheels.

As for the drive power distribution control, as seen in FIG. 4, by setting one of the number of revolutions of both output shafts Out1 and Out2 to zero, the output from the same output shaft may also become zero, so it then becomes possible to output the total output of both motor/generators MG1 and MG2 to the other output shaft. Therefore, by determining the output of the motor/generators MG1 and MG2 so as to establish a relation of Tmg1·Nmg1+Tmg2·Nmg2=Tout1·Nout1+Tout2·Nout2, the drive power distribution of the output shafts Out1 and Out2 may be changed arbitrarily from 0% to 100%, permitting an active drive power distribution control of the front/rear wheels of four-wheel-drive vehicles to enhance maneuverability, and is thus extremely useful in enhancing the running stability of vehicles due to the drive power distribution control of the left/right wheels.

In addition, according to the transmission of the present invention described above, one differential unit 5 (planetary gear group G1 and G2) and the other differential unit 6 (planetary gear group G3) are coaxially located in parallel as shown in FIG. 1, and the connections among the rotary elements of these differential units, and the connections of both motor/generators MG1 and MG2 as well as both output shafts Out1 and Out2 to these rotary elements are to be the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located as in the present embodiment, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As seen from said explanation of the action and from FIG. 4, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output, assuring a reduction in the required number of revolutions, and is thus also applicable to a system in which such a high-power motor is used without any problem or restriction in use.

Finally, as described above, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so without any restriction in use, it is also applicable to cases in which the torque distribution to a dual output system needs to be freely controlled.

Figure 5:
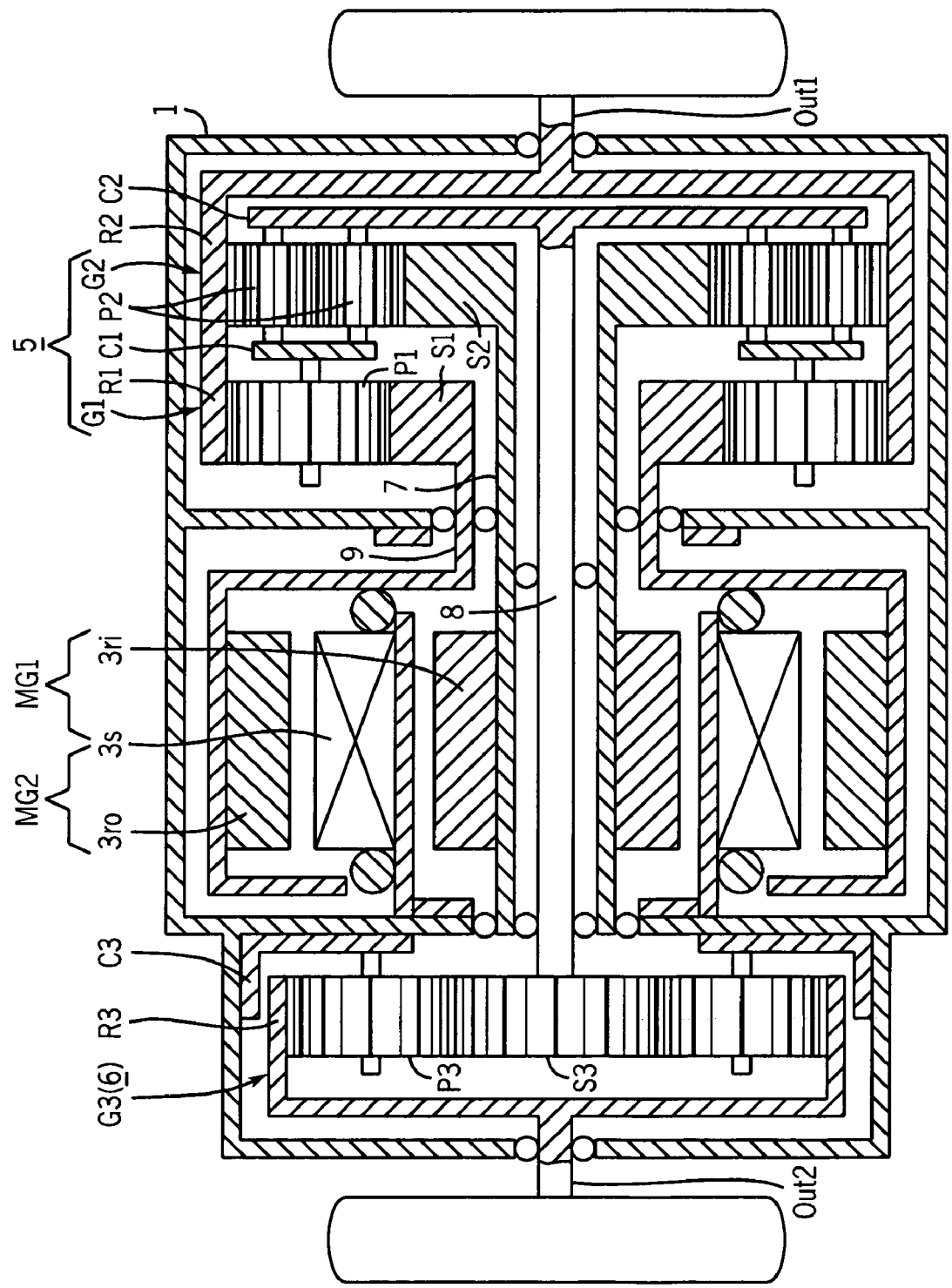
FIG. 5 is an outline drawing showing a concept of a transmission in another embodiment of the present invention.
Figure 6:
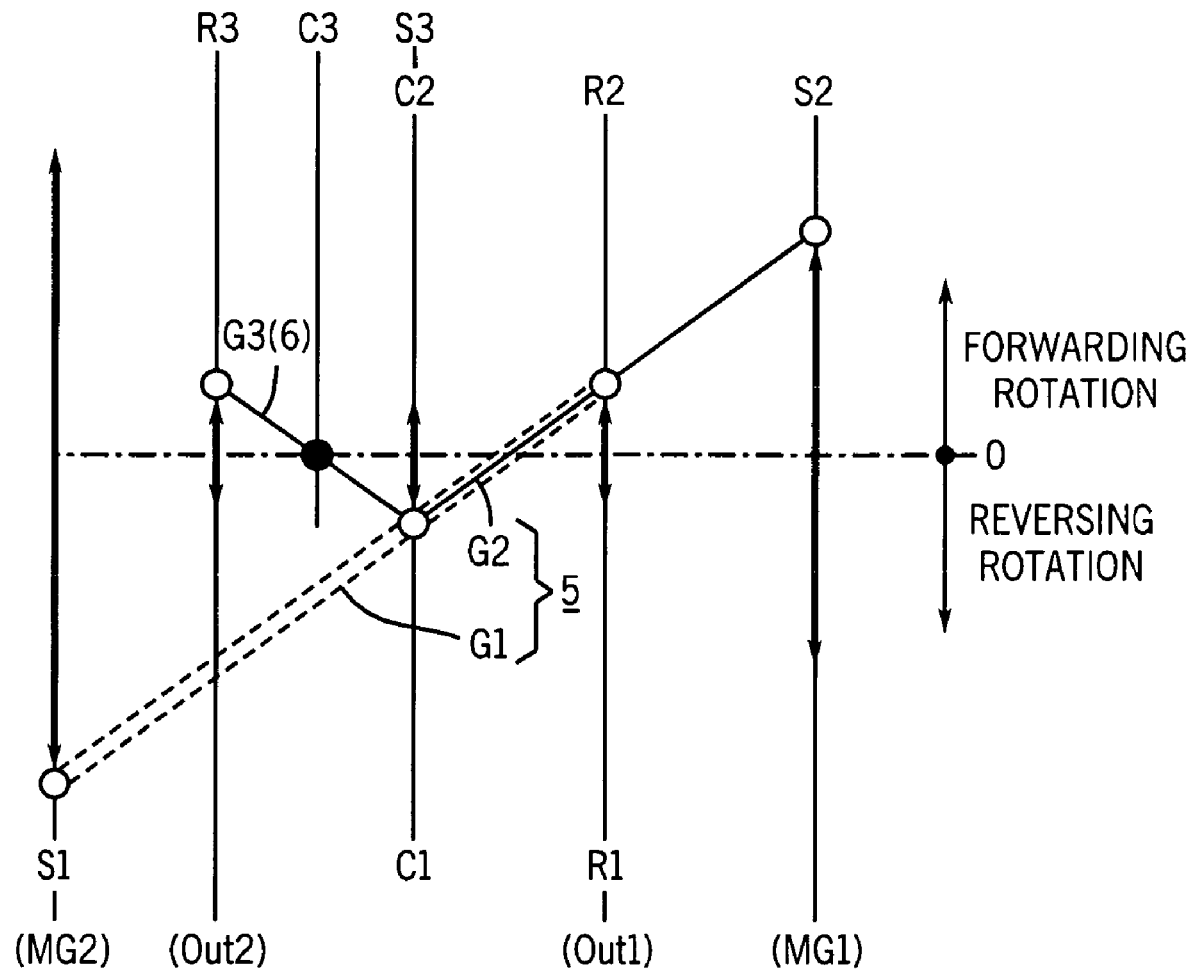
FIG. 6 is an alignment chart of a transmission in the same embodiment.

FIG. 5 represents a transmission of the other embodiment of the present invention, and FIG. 6 is the alignment chart. In the present embodiment, one differential unit 5 is comprised of a first planetary gear group G1 of the single-pinion planetary gear group and a second planetary gear group G2 of the double-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the double-pinion planetary gear group, the ring gear R1 of the first planetary gear group G1 is connected to the ring gear R2 of the second planetary gear group G2, and at the same time, the carrier C1 of the first planetary gear group G1 is connected to the carrier C2 of the second planetary gear group G2.

A mutually connected body of the ring gears R1 and R2 is connected to one output shaft Out1, a mutually connected body of the carriers C1 and C2 is connected to the sun gear S3 of the third planetary gear group G3 by a center shaft 8, the other motor/generator MG2 (in the present embodiment, the outside motor/generator is regarded as MG2, and the inside motor/generator is regarded as MG1) is connected by the hollow shaft 9 to the sun gear S1 of the first planetary gear group G1, and one motor/generator MG1 is connected by the hollow shaft 7 to the sun gear S2 of the second planetary gear group G2. The carrier C3 of the third planetary gear group G3 is fixed, and the ring gear R3 of the third planetary gear group G3 is connected to the other output shaft Out2.

The transmission of the present embodiment with such a structure is found in FIG. 6, represented by an alignment chart, but the rotary members to be assigned differ from the case in FIG. 2, which is the same shape of alignment chart as in this figure, and similar to said embodiment, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 5, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6, which are coaxially located in parallel, thereby avoiding the problem of radially enlarging a transmission including both motor/generators MG1 and MG2.

By adopting a structure wherein motor/generators MG1 and MG2 are placed together to be coaxially located as in the present embodiment, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from said motors is output assuring a reduction in the required number of revolutions, so it is also applicable to a system in which such a high-power motor is used without any problem or restriction in use.

Figure 7:
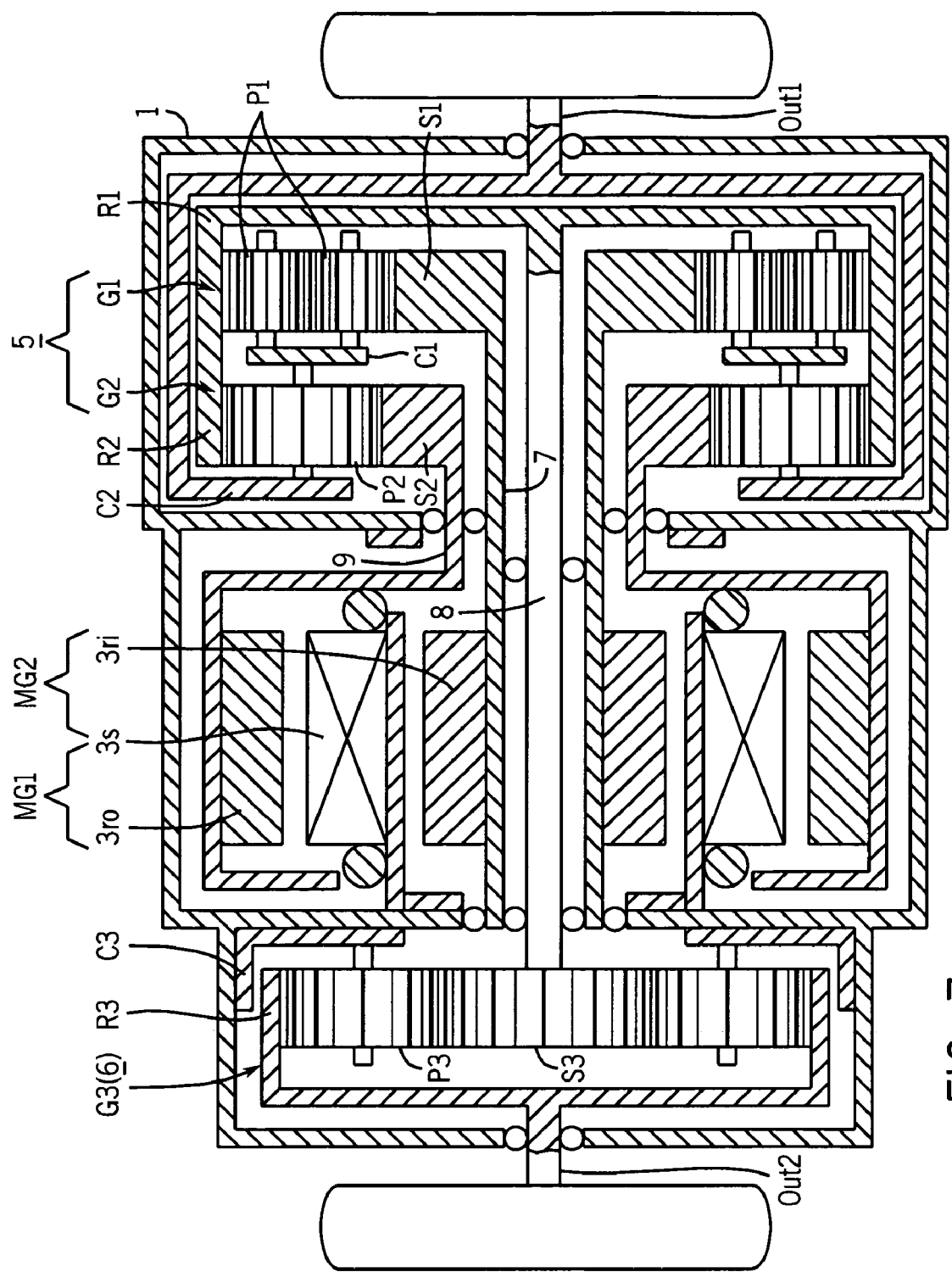
FIG. 7 is an outline drawing showing a concept of a transmission in another embodiment of the present invention.
Figure 8:
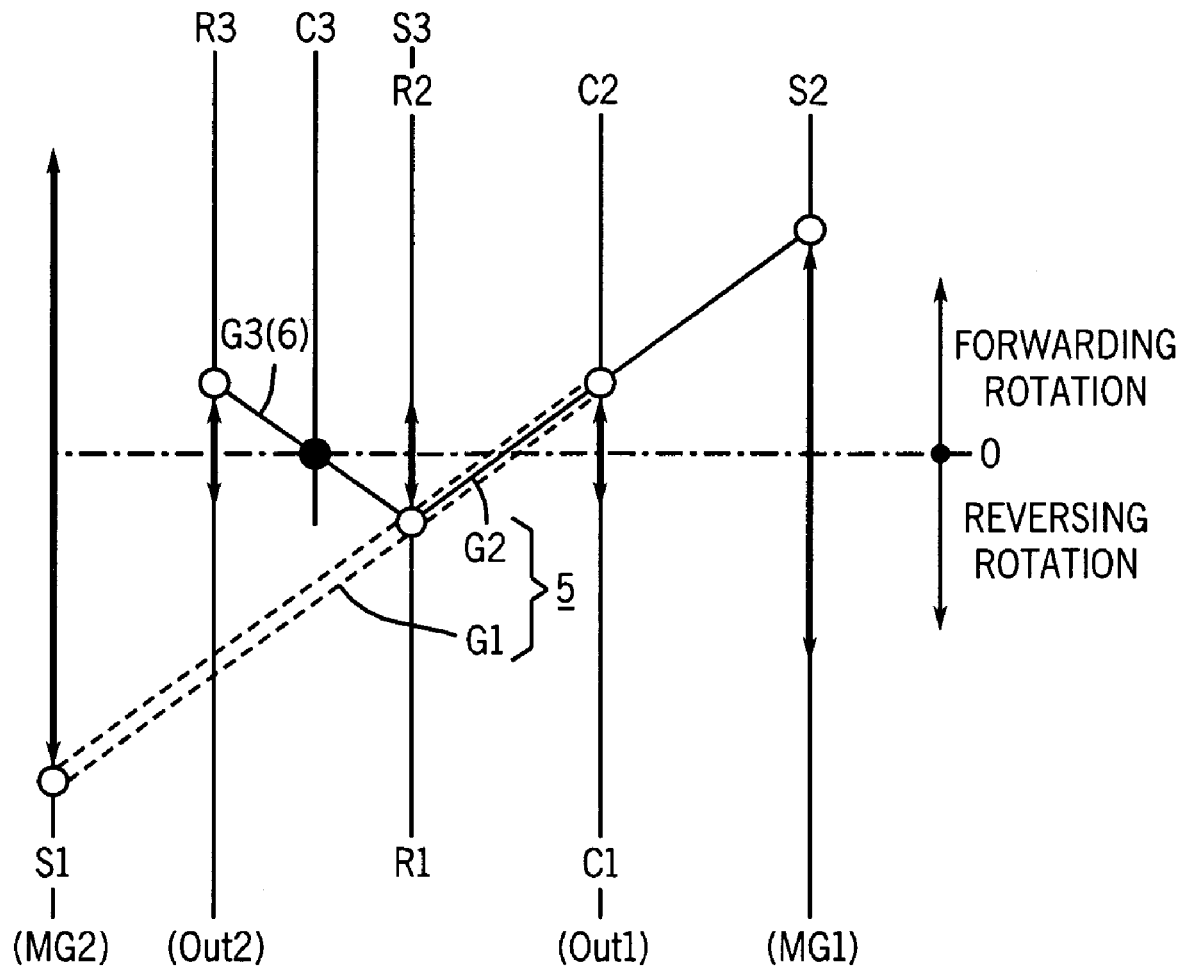
FIG. 8 is an alignment chart of a transmission in the same embodiment.

FIG. 7 represents a transmission of the other embodiment of the present invention, and FIG. 8 is the alignment chart. In the present embodiment, one differential unit 5 is comprised of a first planetary gear group G1 of the double-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the double-pinion planetary gear group and the second planetary gear group G2 of the single-pinion planetary gear group, the ring gear R1 of the first planetary gear group G1 is connected to the ring gear R2 of the second planetary gear group G2, and at the same time, the carrier C1 of the first planetary gear group G1 is connected to the carrier C2 of the second planetary gear group G2.

A mutually connected body of the carriers C1 and C2 is connected to one output shaft Out1, a mutually connected body of the ring gears R1 and R2 is connected by the center shaft 8 to the sun gear S3 of the third planetary gear group G3, the other motor/generator MG2 (in the present embodiment, the inside motor/generator is regarded as MG2, and the outside motor/generator is regarded as MG1) is connected by the hollow shaft 7 to the sun gear S1 of the first planetary gear group G1, and one motor/generator MG1 is connected by the hollow shaft 9 to the sun gear S2 of the second planetary gear group G2. The carrier C3 of the third planetary gear group G3 is fixed, and the ring gear R3 of the third planetary gear group G3 is connected to the other output shaft Out2.

The transmission of the present embodiment with such a structure is found in FIG. 8, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 7, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located as in the present embodiment, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output, assuring a reduction in the required number of revolutions, and is thus also applicable to a system in which such a high-power motor is used without any problem or restriction in use.

Figure 9:
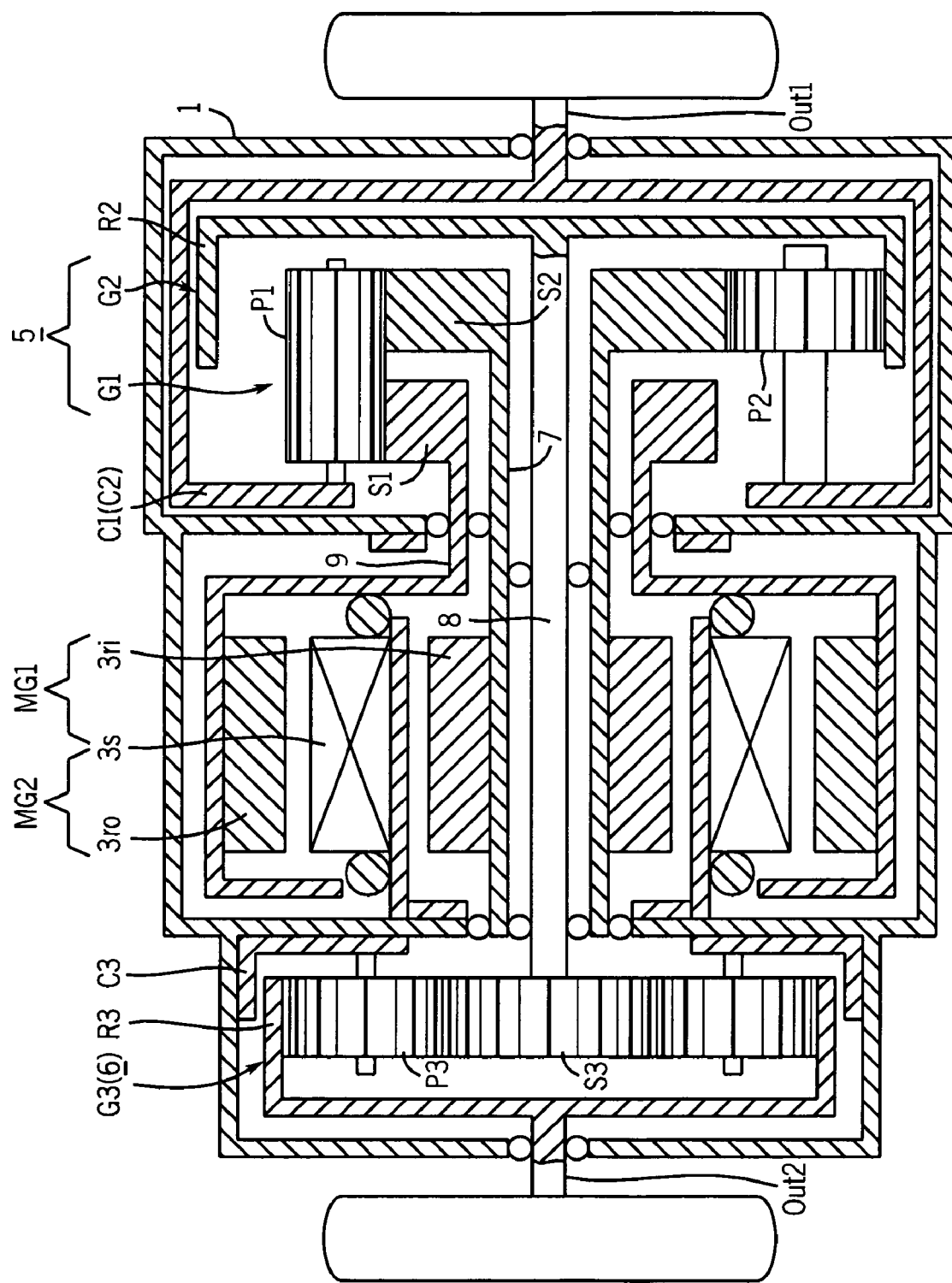
FIG. 9 is an outline drawing showing a concept of a transmission in another embodiment of the present invention.
Figure 10:
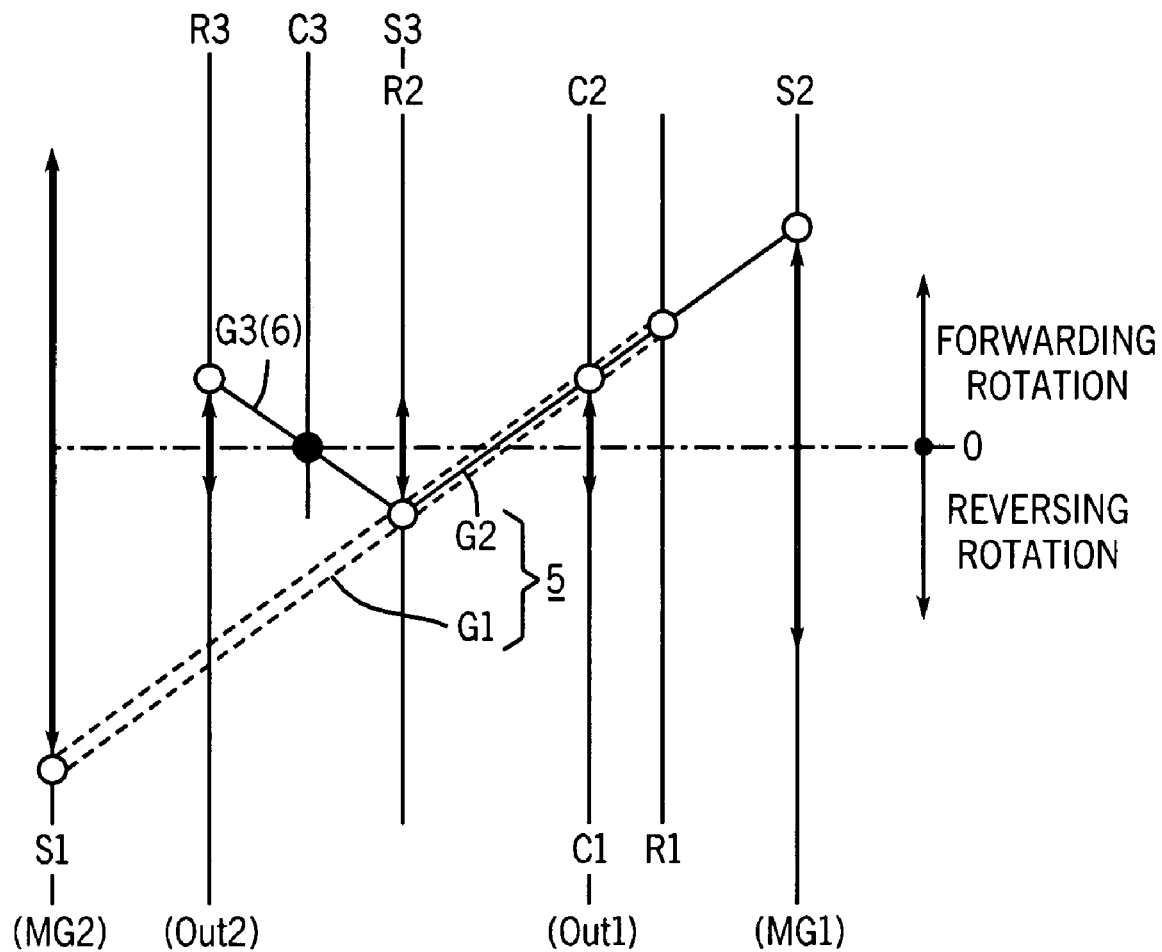
FIG. 10 is an alignment chart of a transmission in the same embodiment.

FIG. 9 represents a transmission of the other embodiment of the present invention, and FIG. 10 is the alignment chart. In the present embodiment, one differential unit 5 is comprised of a first planetary gear group G1 of the single-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the single-pinion planetary gear group, the pinion P1 of the first planetary gear group G1 is to be engaged also to the sun gear S2 of the second planetary gear group G2, and the pinions P1 and P2 of the first planetary gear group G1 and the second planetary gear group G2, respectively, are rotatably supported by the common carrier C1 (C2).

The common carrier C1 (C2) is connected to one output shaft Out1, the ring gear R2 of the second planetary gear group G2 is connected by the center shaft 8 to the sun gear S3 of the third planetary gear group G3, the other motor/generator MG2 (in the present embodiment, the outside motor/generator is regarded as MG2, and the inside motor/generator is regarded as MG1) is connected by the hollow shaft 9 to the sun gear S1 of the first planetary gear group G1, and one motor/generator MG1 is connected by the hollow shaft 7 to the sun gear S2 of the second planetary gear group G2. The carrier C3 of the third planetary gear group G3 is fixed, and the ring gear R3 of the third planetary gear group G3 is connected to the other output shaft Out2.

The transmission of the present embodiment with such a structure is found in FIG. 10, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 9, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located as in the present embodiment, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output assuring a reduction in the required number of revolutions, so it is also applicable to a system in which such a high-power motor is used without any problem or restriction in use.

Figure 11:
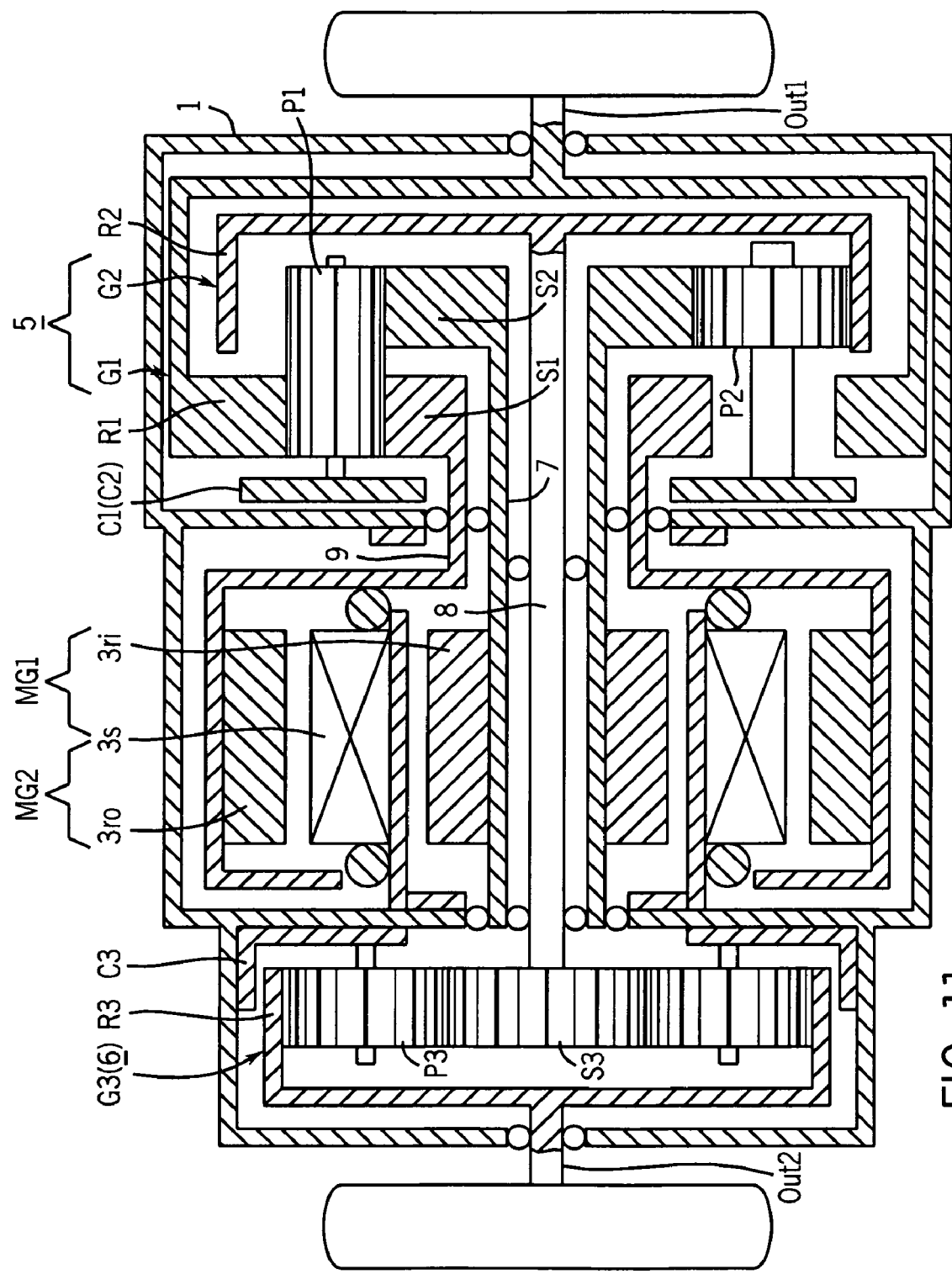
FIG. 11 is an outline drawing showing a concept of a transmission in another embodiment of the present invention.
Figure 12:
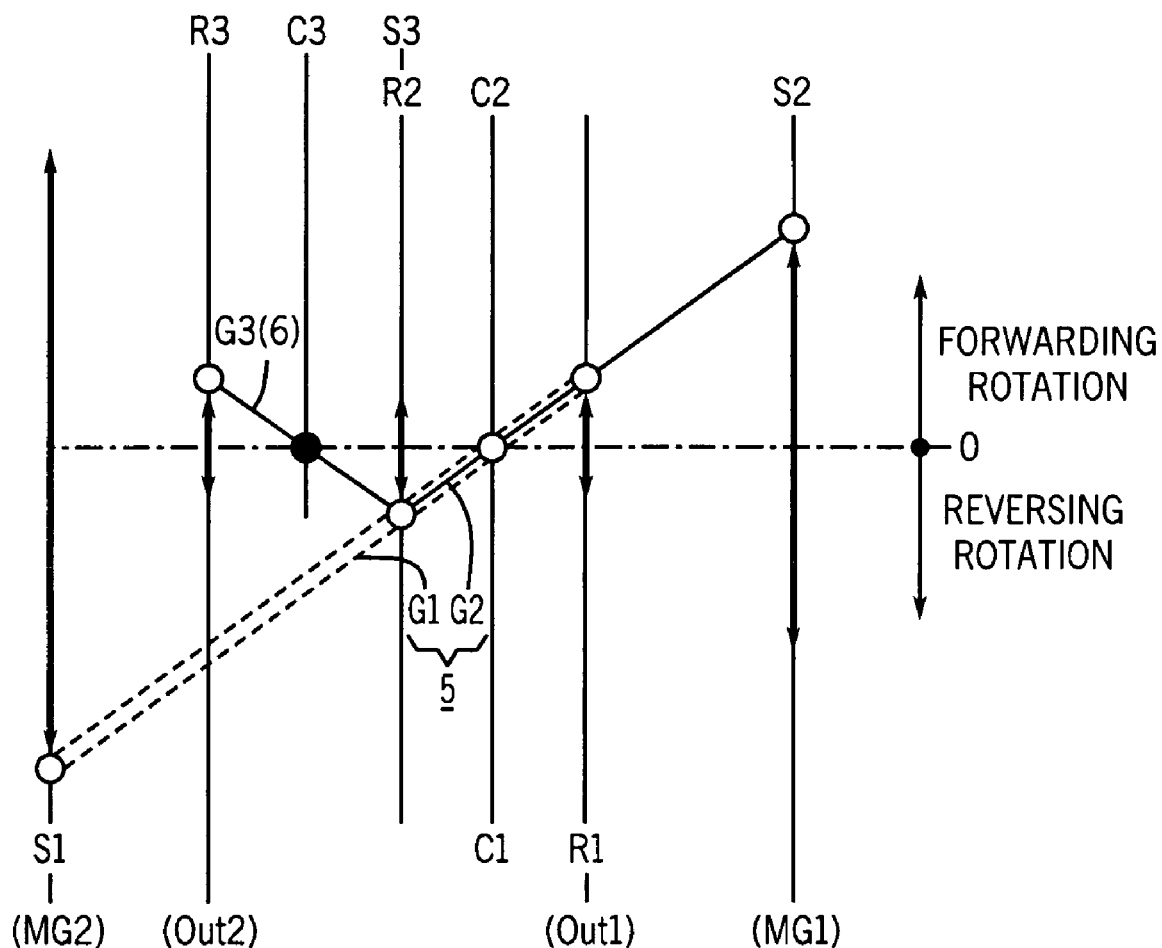
FIG. 12 is an alignment chart of a transmission in the same embodiment.

FIG. 11 represents a transmission of the other embodiment of the present invention, and FIG. 12 is the alignment chart. In the present embodiment, one differential unit 5 is comprised of a first planetary gear group G1 of the single-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the single-pinion planetary gear group, the pinion P1 of the first planetary gear group G1 is to be engaged also to the sun gear S2 of the second planetary gear group G2, and the pinions P1 and P2 of the first planetary gear group G1 and the second planetary gear group G2, respectively, are rotatably supported by the common carrier C1 (C2).

The ring gear R1 of the first planetary gear group G1 is connected to one output shaft Out1, the ring gear R2 of the second planetary gear group G2 is connected by the center shaft 8 to the sun gear S3 of the third planetary gear group G3, the other motor/generator MG2 (in the present embodiment, the outside motor/generator is regarded as MG2, and the inside motor/generator is regarded as MG1) is connected by the hollow shaft 9 to the sun gear S1 of the first planetary gear group G1, and one motor/generator MG1 is connected by the hollow shaft 7 to the sun gear S2 of the second planetary gear group G2. The carrier C3 of the third planetary gear group G3 is fixed, and the ring gear R3 of the third planetary gear group G3 is connected to the other output shaft Out2.

The transmission of the present embodiment with such a structure is found in FIG. 12, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, and one differential unit 5 (planetary gear group G1 and G2) and the other differential unit 6 (planetary gear group G3) are coaxially located in parallel as shown in FIG. 11, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located as in the present embodiment, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output assuring a reduction in the required number of revolutions, so it is also applicable to a system in which such a high-power motor is used without any problem or restriction in use.

Figure 13:
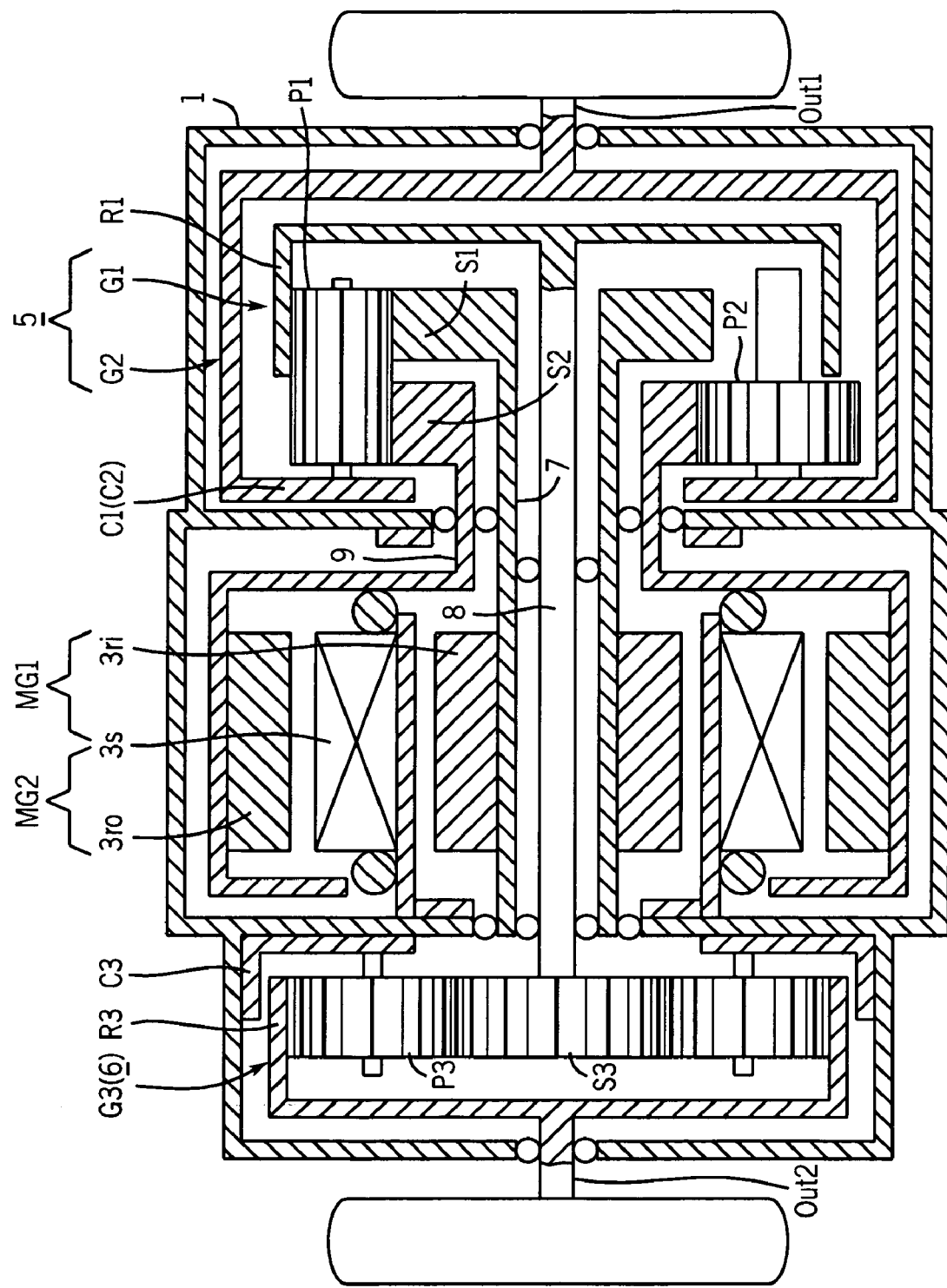
FIG. 13 is an outline drawing showing a concept of a transmission in another embodiment of the present invention.
Figure 14:
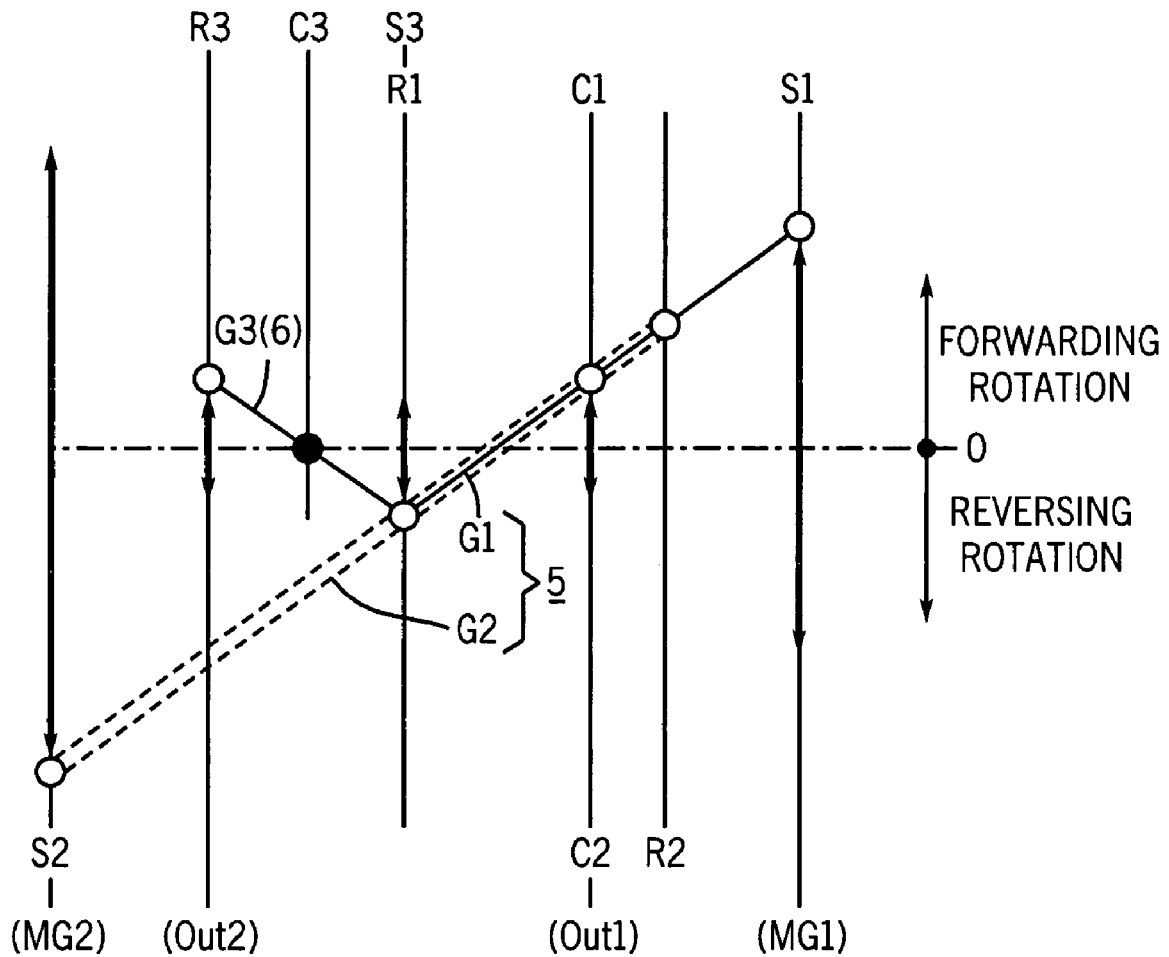
FIG. 14 is an alignment chart of a transmission in the same embodiment.

FIG. 13 represents a transmission of the other embodiment of the present invention, and FIG. 14 is the alignment chart. In the present embodiment, one differential unit 5 is comprised of a first planetary gear group G1 of the single-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the single-pinion planetary gear group, the pinion P1 of the first planetary gear group G1 is to be engaged also to the sun gear S2 of the second planetary gear group G2, and the pinions P1 and P2 of the first planetary gear group G1 and the second planetary gear group G2, respectively, are rotatably supported by the common carrier C1 (C2).

The common carrier Cl (C2) is connected to one output shaft Out1, the ring gear R1 of the first planetary gear group G1 is connected by the center shaft 8 to the sun gear S3 of the third planetary gear group G3, the other motor/generator MG2 (in the present embodiment, the outside motor/generator is regarded as MG2, and the inside motor/generator is regarded as MG1) is connected by the hollow shaft 9 to the sun gear S2 of the second planetary gear group G2, and one motor/generator MG1 is connected by the hollow shaft 7 to the sun gear S1 of the first planetary gear group G1. The carrier C3 of the third planetary gear group G3 is fixed, and the ring gear R3 of the third planetary gear group G3 is connected to the other output shaft Out2.

The transmission of the present embodiment with such a structure is found in FIG. 12, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 13, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located as in the present embodiment, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output assuring a reduction in the required number of revolutions, so it is also applicable to a system in which such a high-power motor is used without any problem or restriction in use.

Figure 15:
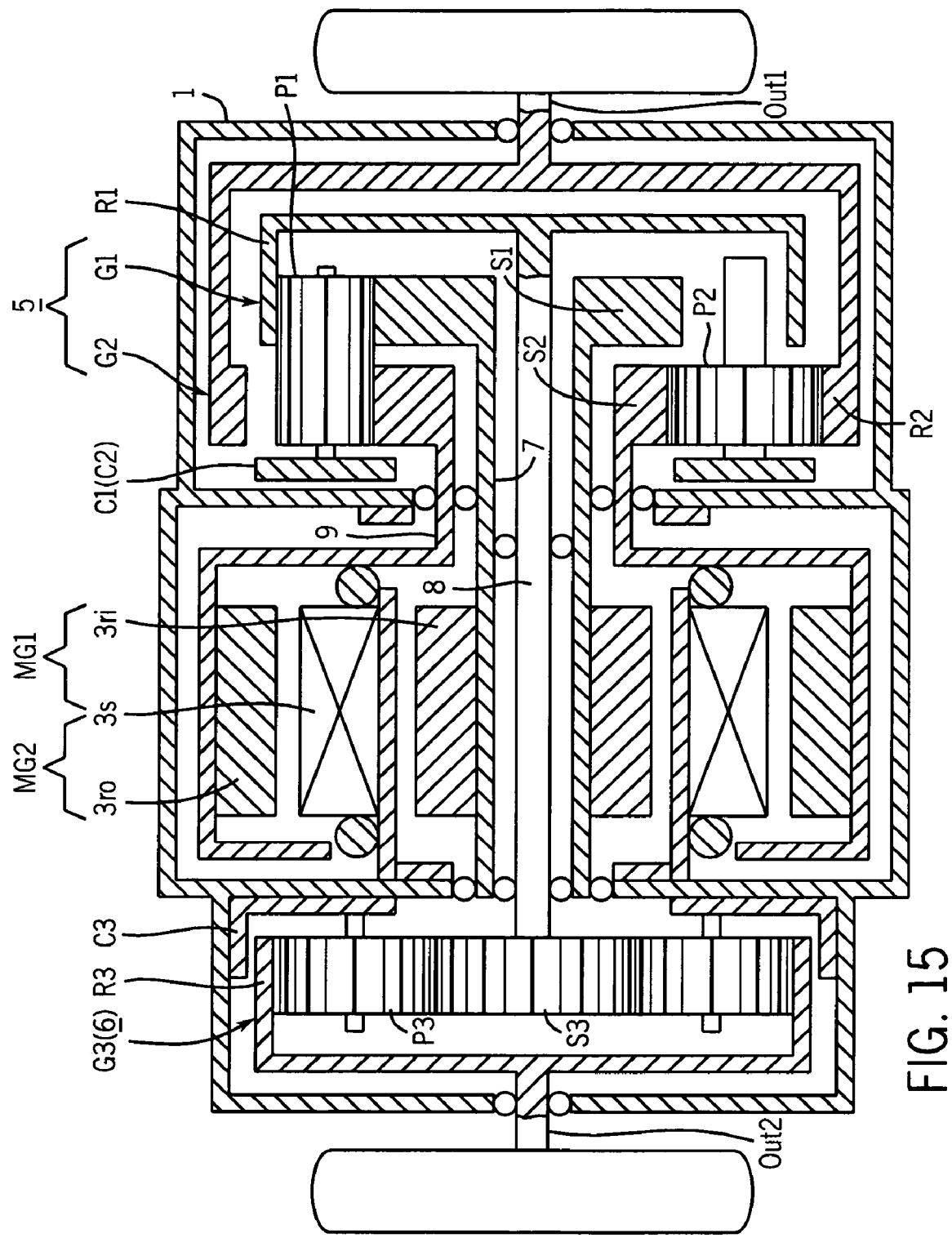
FIG. 15 is an outline drawing showing a concept of a transmission in other embodiment of the present invention.
Figure 16:
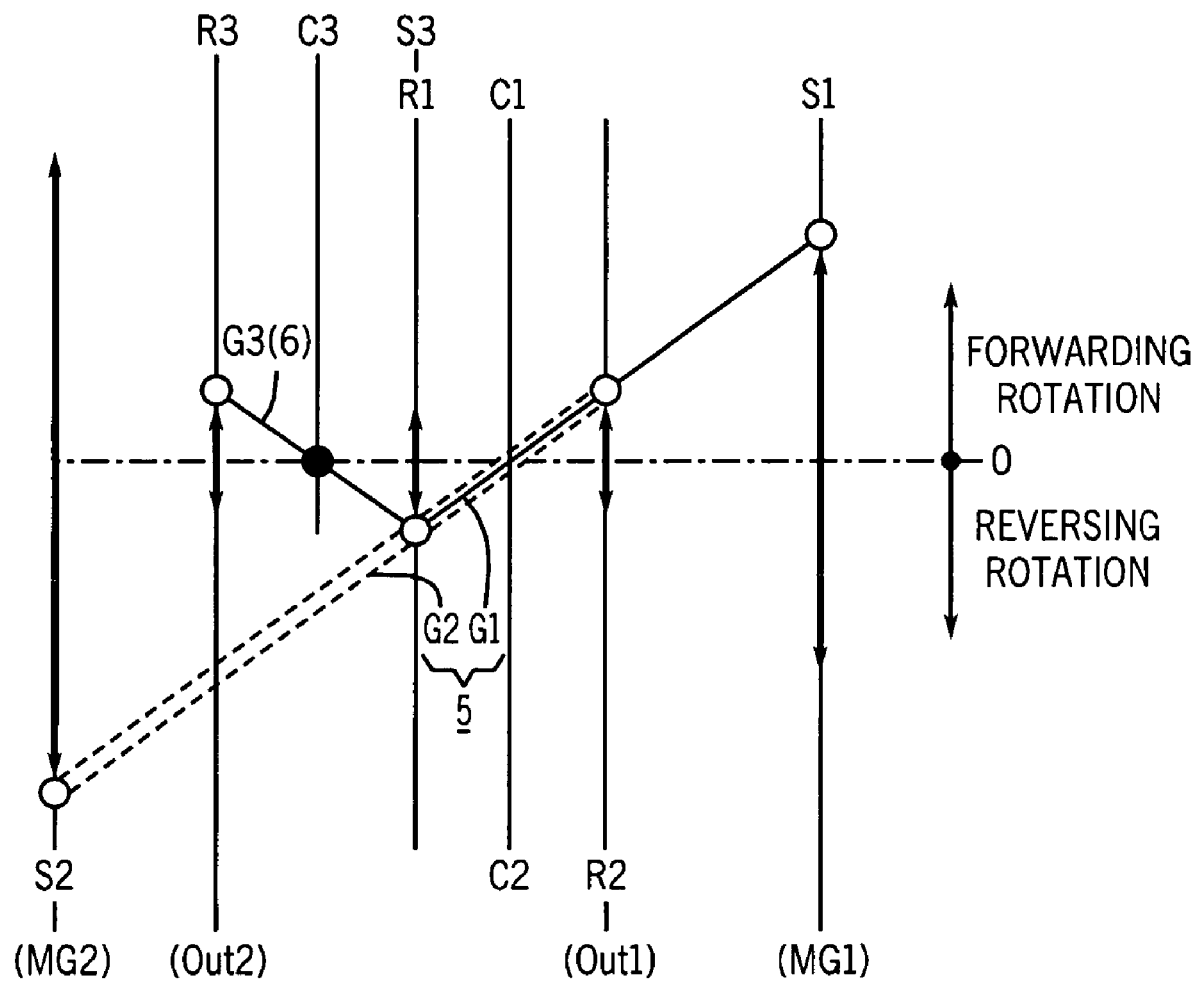
FIG. 16 is an alignment chart of a transmission in the same embodiment.

FIG. 15 represents a transmission of the other embodiment of the present invention, and FIG. 16 is the alignment chart. In the present embodiment, one differential unit 5 is comprised of a first planetary gear group G1 of the single-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the single-pinion planetary gear group, the pinion P1 of the first planetary gear group G1 is to be engaged also to the sun gear S2 of the second planetary gear group G2, and the pinions P1 and P2 of the first planetary gear group G1 and the second planetary gear group G2, respectively, are rotatably supported by the common carrier C1 (C2).

The ring gear R2 of the second planetary gear group G2 is connected to one output shaft Out1, the ring gear R1 of the first planetary gear group G1 is connected by the center shaft 8 to the sun gear S3 of the third planetary gear group G3, the other motor/generator MG2 (in the present embodiment, the outside motor/generator is regarded as MG2, and the inside motor/generator is regarded as MG1) is connected by the hollow shaft 9 to the sun gear S2 of the second planetary gear group G2, and one motor/generator MG1 is connected by the hollow shaft 7 to the sun gear S1 of the first planetary gear group G1. The carrier C3 of the third planetary gear group G3 is fixed, and the ring gear R3 of the third planetary gear group G3 is connected to the other output shaft Out2.

The transmission of the present embodiment with such a structure is found in FIG. 16, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 15, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output assuring a reduction in the required number of revolutions, so it is also applicable to a system in which such a high-power motor is used without any problem or restriction in use.

Figure 17:
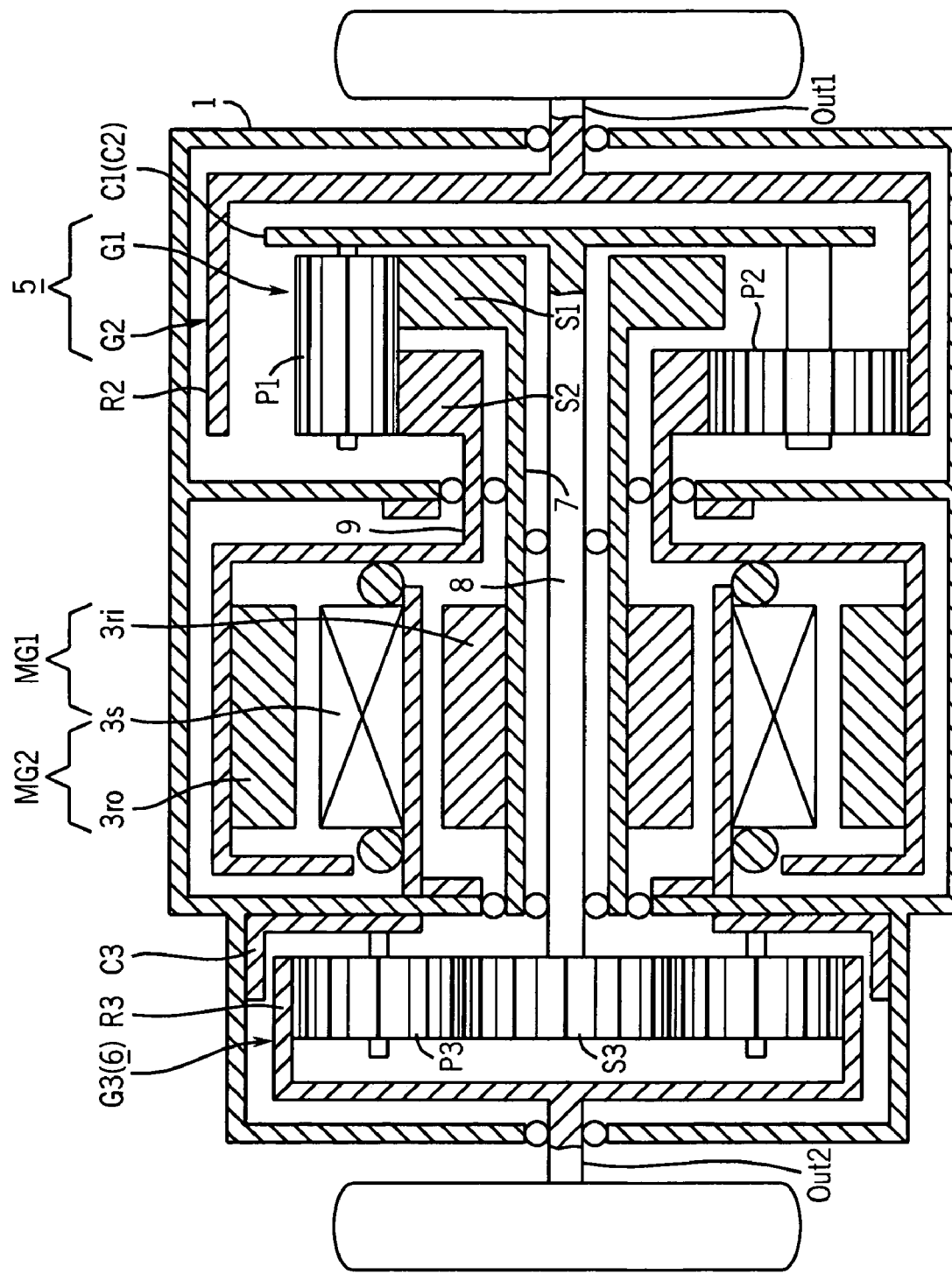
FIG. 17 is an outline drawing showing a concept of a transmission in another embodiment of the present invention.
Figure 18:
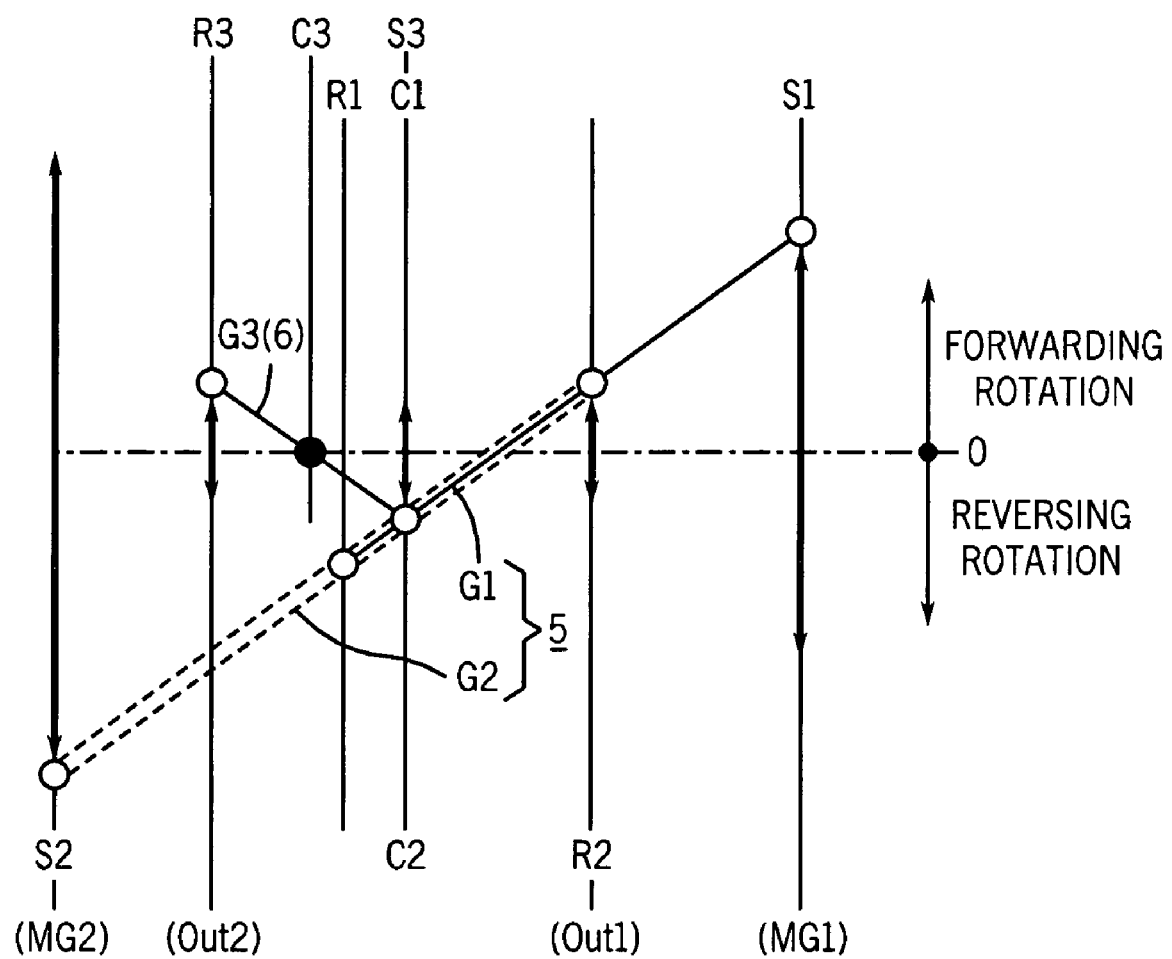
FIG. 18 is an alignment chart of a transmission in the same embodiment.

FIG. 17 represents a transmission of the other embodiment of the present invention, and FIG. 18 is the alignment chart. In the present embodiment, one differential unit 5 is comprised of a first planetary gear group G1 of the single-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the single-pinion planetary gear group, the pinion P1 of the first planetary gear group G1 is to be engaged also to the sun gear S2 of the second planetary gear group G2, and the pinions P1 and P2 of the first planetary gear group G1 and the second planetary gear group G2, respectively, are rotatably supported by the common carrier C1 (C2).

The ring gear R2 of the second planetary gear group G2 is connected to one output shaft Out1, the common carrier C1 (C2) is connected by the center shaft 8 to the sun gear S3 of the third planetary gear group G3, the other motor/generator MG2 (in the present embodiment, the outside motor/generator is regarded as MG2, and the inside motor/generator is regarded as MG1) is connected by the hollow shaft 9 to the sun gear S2 of the second planetary gear group G2, and one motor/generator MG1 is connected by the hollow shaft 7 to the sun gear S1 of the first planetary gear group G1. The carrier C3 of the third planetary gear group G3 is fixed, and the ring gear R3 of the third planetary gear group G3 is connected to the other output shaft Out2.

The transmission of the present embodiment with such a structure is found in FIG. 18, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 17, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output assuring a reduction in the required number of revolutions, so it is also applicable to a system in which such a high-power motor is used without any problem or restriction in use.

Figure 19:
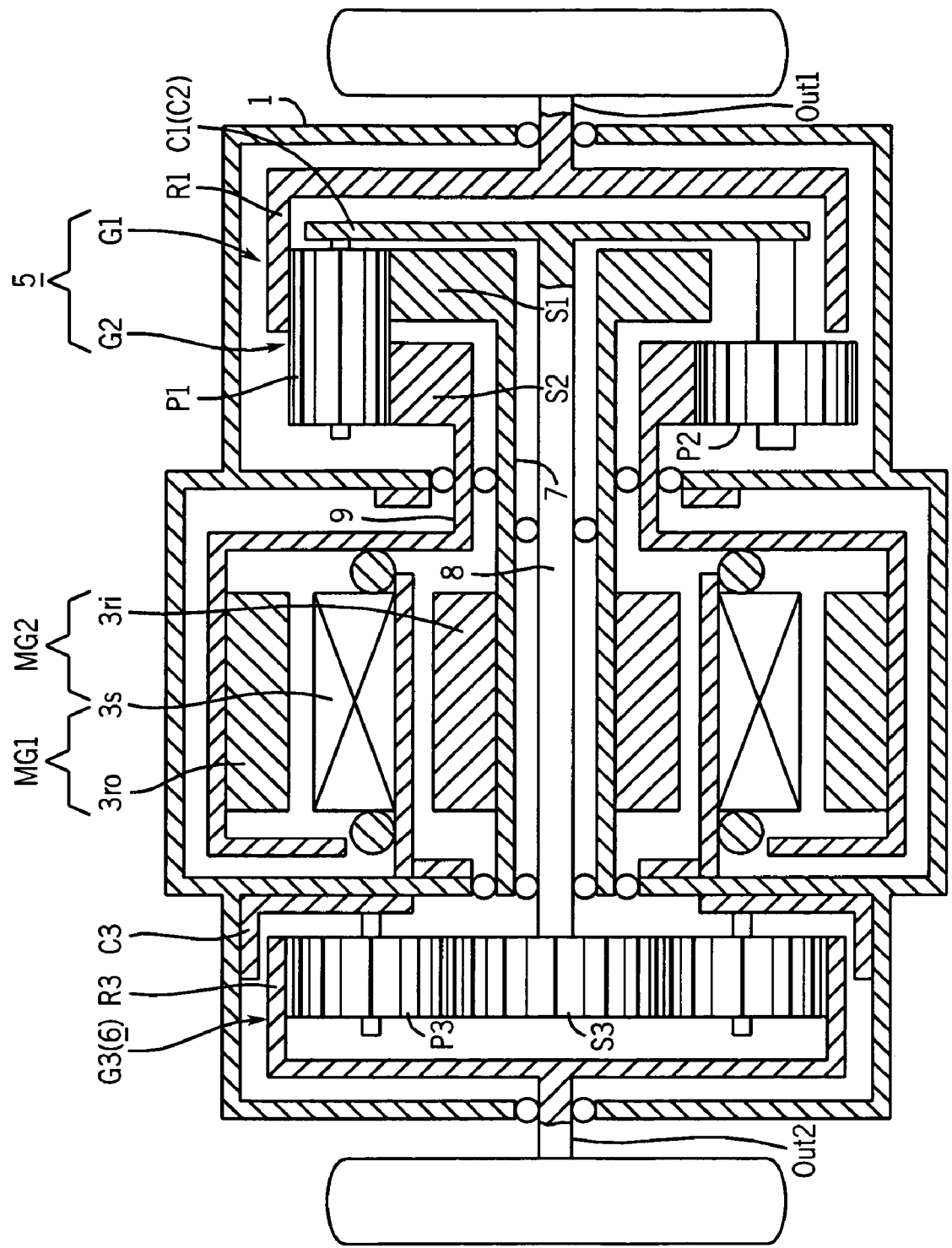
FIG. 19 is an outline drawing showing a concept of a transmission in another embodiment of the present invention.
Figure 20:
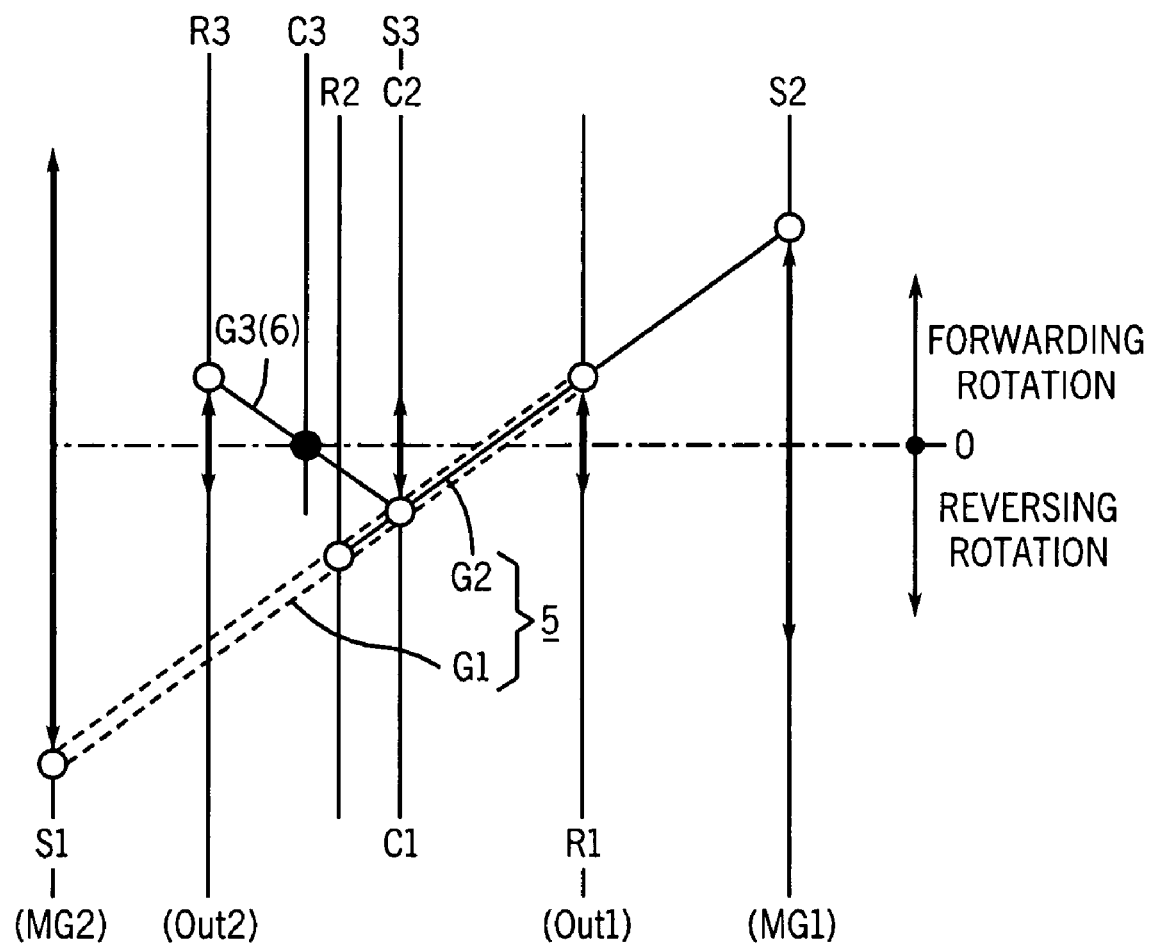
FIG. 20 is an alignment chart of a transmission in the same embodiment.

FIG. 19 represents a transmission of the other embodiment of the present invention, and FIG. 20 is the alignment chart. In the present embodiment, one differential unit 5 is comprised of a first planetary gear group G1 of the single-pinion planetary gear group and a second planetary gear group G2 of the single-pinion planetary gear group, while the other differential unit 6 is comprised of a third planetary gear group G3 of the single-pinion planetary gear group. In order to construct one differential unit 5 comprising the first planetary gear group G1 of the single-pinion planetary gear group and the second planetary gear group G2 of the single-pinion planetary gear group, the pinion P1 of the first planetary gear group G1 is to be engaged also to the sun gear S2 of the second planetary gear group G2, and the pinions P1 and P2 of the first planetary gear group G1 and the second planetary gear group G2, respectively, are rotatably supported by the common carrier C1 (C2).

The ring gear R1 of the first planetary gear group G1 is connected to one output shaft Out1, the common carrier C1 (C2) is connected by the center shaft 8 to the sun gear S3 of the third planetary gear group G3, the other motor/generator MG2 (in the present embodiment, the inside motor/generator is regarded as MG2, and the outside motor/generator is regarded as MG1) is connected by the hollow shaft 7 to the sun gear S1 of the first planetary gear group G1, and one motor/generator MG1 is connected by the hollow shaft 9 to the sun gear S2 of the second planetary gear group G2. The carrier C3 of the third planetary gear group G3 is fixed, and the ring gear R3 of the third planetary gear group G3 is connected to the other output shaft Out2.

The transmission of the present embodiment with such a structure is found in FIG. 20, represented by an alignment chart, although the rotary members to be assigned differ from a case in FIG. 2, which is the same shape of alignment chart as in this figure, similar to the embodiment in FIGS. 1 through 4, because the rotation of both motor/generators MG1 and MG2 is distributed and output to both output shafts Out1 and Out2 while the rotation is being reduced by both differential units 5 and 6, the torque distribution to both output shafts Out1 and Out2 becomes freely controllable according to the output combination of both motor/generators MG1 and MG2, so it is also applicable to cases in which the torque distribution to a dual output system needs to be freely controlled with no restriction in use.

According to the transmission of the present invention, one differential unit 5 (planetary gear group G1 and G2) and the other differential unit 6 (planetary gear group G3) are coaxially located in parallel as shown in FIG. 19, and the connections among the rotary elements of these differential units, and the connections of both motor/generators MG1 and MG2 as well as both output shafts Out1 and Out2 to these rotary elements are the connections described above, so that the rotation of both motor/generators MG1 and MG2 is distributed and output to both output shafts Out1 and Out2 under deceleration by both differential units 5 and 6, and both motor/generators MG1 and MG2 are able to be placed coaxially to both differential units 5 and 6 that are coaxially located in parallel, thereby avoiding the problem of radially enlarging a transmission including both motor/generators MG1 and MG2.

By adopting a structure wherein motor/generators MG1 and MG2 are placed together to be coaxially located, axially on one side, one differential unit 5 (planetary gear group G1 and G2) is coaxially located, and at the same time, from one side of which one output shaft Out1 is coaxially extended, and axially on the other side of the motor/generators MG1 and MG2 that are placed together, the other differential unit 6 (planetary gear group G3) is coaxially located, and at the same time, from the other side of which the other output shaft Out2 is coaxially extended, so the action effect related to said small sizing radially becomes more significant.

As described above, because the rotation of both motor/generators MG1 and MG2 is distributed and output to both output shafts Out1 and Out2 while the rotation is being reduced by both differential units 5 and 6, a large reduction ratio may be set according to the combination of both differential units 5 and 6, so even when a high-power motor rotatable at high speed is required, the rotation from the same motors is output assuring a reduction in the required number of revolutions, so it is also applicable to a system in which such a high-power motor is used without any problem or restriction in use.

In each embodiment described above, although one output shaft Out1 is directly connected to a corresponding rotary member of one differential unit 5, the reduction ratio of the transmission may be further increased by connecting through a gear reduction mechanism, due to the reduction ratio fraction. Hence, three embodiments—in which one output shaft Out1 is connected to a corresponding rotary member of one differential unit 5 through a gear reduction mechanism—are explained sequentially as follows, based on FIG. 21 through FIG. 24, FIG. 25 and FIG. 26, and FIG. 27 and FIG. 28.

Figure 21:
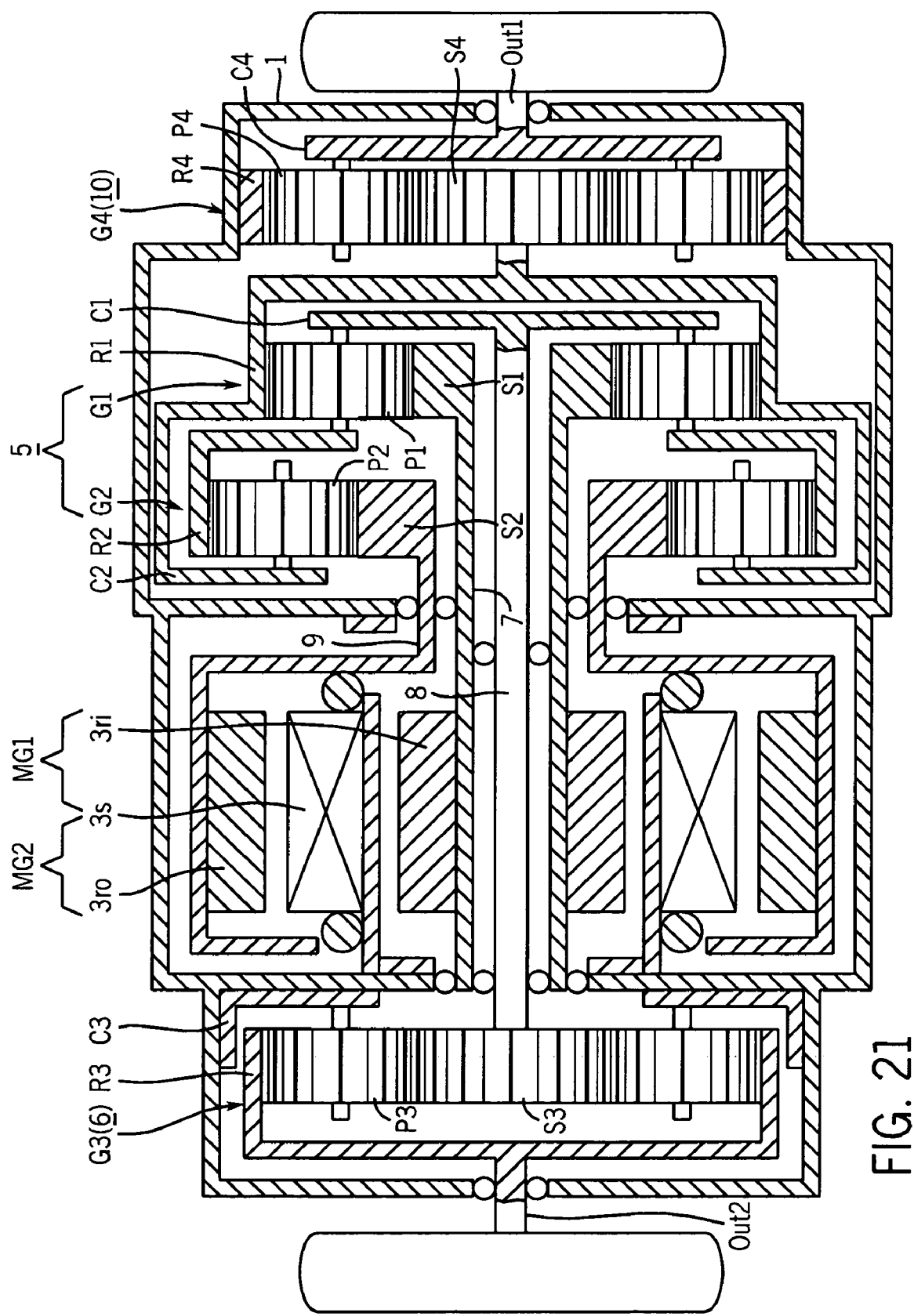
FIG. 21 is an outline drawing showing a concept of a transmission in yet another embodiment of the present invention.

In the present embodiment shown in FIG. 21 though 24, as illustrated in the outline drawing of FIG. 21, axially on the right side (left/right direction in the figure) within the casing 1, one differential unit 5 comprising two coaxially located—i.e. a first and a second—planetary gear groups G1 and G2, and the third differential unit 10 comprising a fourth planetary gear group G4 are coaxially accommodated in parallel, axially on the left side (left/right direction in the figure) within the casing 1, the other differential unit 6 comprising a third planetary gear group G3 is accommodated so as to be located coaxially with the planetary gear groups G1, G2, and G3.

The first and the second planetary gear groups G1 and G2 are located so as to position the first planetary gear group G1 on the right side in the figure, and on the right side of which, the fourth planetary gear group G4 is located. One motor/generator MG1 and the other motor/generator MG2 are interposed coaxially between the first as well as second planetary gear group G1 and G2, and the third planetary gear group G3, and as in said each embodiment, these motor/generators MG1 and MG2 serve as a composite current dual-layer motor comprising a common stator 3s, a rotor 3ri of the motor/generator MG1 located on the inner circumference, and a rotor 3ro of the motor/generator MG2 located on the outer circumference. However, in the present embodiment, the outside motor/generator is regarded as MG2 and the inside motor/generator is regarded as MG1. Instead of comprising the motor/generator MG1 and MG2 as one unit to serve as a composite current dual-layer motor, it may also be comprised as an individual unit having an individual stator. However, in any case, the motor/generators MG1 and MG2 are to be placed coaxially together, and at the same time, be placed coaxially with the planetary gear groups G1, G2, G3, and G4.

As described previously, first planetary gear group G1 and second planetary gear group G2 construct one differential unit 5 in the present invention, third planetary gear group G3 constructs the other differential unit 6 in the present invention, and fourth planetary gear group G4 constructs third differential unit 10 in the present invention. Where these first planetary gear group G1, second planetary gear group G2, third planetary gear group G3, and fourth planetary gear group G4, respectively, are regarded as a single-pinion planetary gear group comprising a sun gear S1, S2, S3, S4, a ring gear R1, R2, R3, R4 and a carrier C1, C2, C3, C4 rotatably supporting a pinion P1, P2, P3, P4 that engages with the sun gear and the ring gear. Herein, to construct one differential unit 5 comprising a first planetary gear group G1 and a second planetary gear group G2, the carrier C1 of the first planetary gear group G1 is connected to the ring gear R2 of the second planetary gear group G2, and at the same time the ring gear R1 of the first planetary gear group G1 is connected to the carrier C2 of the second planetary gear group G2.

Then, although the ring gear R1 of the first planetary gear group G1 is connected to one output shaft Out1, the connection is not to be a direct connection, but rather a connection through fourth planetary gear group G4 (third differential unit 10). That is, the ring gear R1 of the first planetary gear group G1 is connected to the sun gear S4 of a fourth planetary gear group G4 (third differential unit 10), the ring gear R4 of a fourth planetary gear group G4 (third differential unit 10) is fixed onto the casing 1, and the carrier C4 of a fourth planetary gear group G4 (third differential unit 10) is connected to one output shaft Out1.

The carrier C1 of the first planetary gear group G1 is connected to the sun gear S3 of the third planetary gear group G3 by the center shaft 8 to the sun gear S1 of the first planetary gear group G1 through the hollow shaft 7 to which one motor/generator MG1 is connected, and to the sun gear S2 of the second planetary gear group G2 through the hollow shaft 9 to which the other motor/generator MG2 is connected. The carrier C3 of the third planetary gear group G3 is fixed and the ring gear R3 of the third planetary gear group G3 is connected to the other output shaft Out2.

One output shaft Out1 protruding coaxially and rotatably from the end (right end in FIG. 1) of the casing 1, where fourth planetary gear group G4 is located, is to be connected to a differential gear unit for the rear left/right wheels or to a differential gear unit for the front left/right wheels not illustrated herein. The other output shaft Out2 protruding coaxially and rotatably from the end (left end in FIG. 1) of the casing 1 opposite to the protruding side of the above one output shaft Out1 is connected, for example, to a differential gear unit for the rear left/right wheels or a differential gear unit for the front left/right wheels not illustrated herein.

Figure 22:
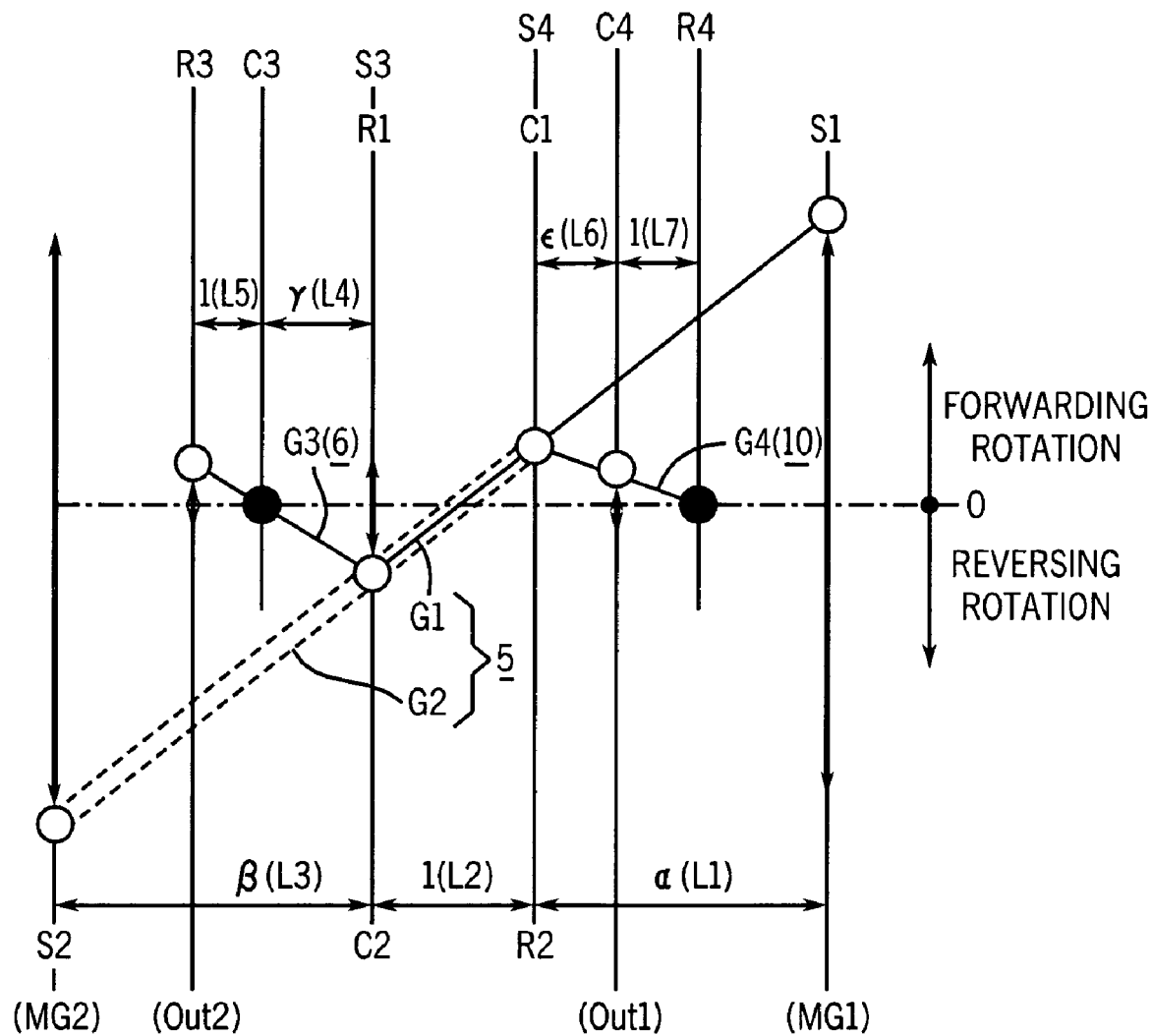
FIG. 22 is an alignment chart of a transmission in the same embodiment.

The above transmission unit comprised as in FIG. 21 can be represented as in FIG. 22 by an alignment chart, the vertical axis in the figure indicates the rotational speeds (0 is the reference, the upward direction in the figure is the forwarding rotational speed and the downward direction is the reversing rotational speed) of the rotary elements constituting the planetary gear groups G1 and G2 (one differential unit 5) and the planetary gear group G3 (the other differential unit 6) as well as the planetary gear group G4 (third differential unit 10), where the horizontal axis indicates the distance ratio between the rotary elements constituting the planetary gear groups G1 and G2 (one differential unit 5) and the planetary gear group G3 (the other differential unit 6) as well as the planetary gear group G4 (third differential unit 10). As described previously, the ring gear R1 and the carrier C2 are connected together, and the carrier C1 and the ring gear R2 are connected together, so that one differential unit 5 comprising the first planetary gear group G1 and second planetary gear group G2 is illustrated as one rod of combined levers indicated by the same numerical mark G1 and G2 in FIG. 22, and the order of the rotational speeds (whether it is in the ascending order or descending order depends on the speed change status) of the rotary elements constituting the same differential unit 5 is:

sun gear S1, carrier C1 (ring gear R2), ring gear R1 (carrier C2), and sun gear S2, in that order.

The other differential unit 6 comprising the third planetary gear group G3 is represented as a lever indicated by the same numerical mark G3 in FIG. 22, as described, because the sun gear S3 is connected to the ring gear R1 (carrier C2) and, at the same time, the carrier C3 is fixed, and the order of the rotational speeds (whether it is in the ascending order or descending order depends on the speed change status) of the rotary elements constituting the same differential unit 6 is: sun gear S3, carrier C3, and ring gear R3, in that order.

In the alignment chart of FIG. 22, two rotary elements of one differential unit 5 (G1 and G2) located approximately in the middle in the direction of the order of the rotational speeds, or in other words, between the carrier C1 (ring gear R2) and the ring gear R1 (carrier C2), to the former carrier C1 (ring gear R2) to which one output shaft Out1 is connected through a third differential unit 10 comprising the fourth planetary gear group G4, and the later ring gear R1 (carrier C2) and the sun gear S3 of the other differential unit 6 (G3) are connected together. In the event of connecting one output shaft Out1 to the carrier C1 (ring gear R2) through third differential unit 10 (fourth planetary gear group G4), among the ring gear R4 and the sun gear S4 of the third differential unit 10 (fourth planetary gear group G4) located at each end, in the direction of the order of the rotational speeds in the alignment chart, the former ring gear R4 is fixed onto the casing 1, the latter sun gear S4 is connected to the carrier C1 (ring gear R2) of one differential unit 5 (G1 and G2), and one output shaft Out 1 is connected to the carrier C4 of the third differential unit 10 (fourth planetary gear group G4) located approximately in the middle, in the direction of the order of the rotational speeds in the alignment chart.

Two rotary elements of one differential unit 5 (G1 and G2) located at each end in the direction of the order of the rotational speeds in the alignment chart of FIG. 22, or in other words, between the sun gear S1 and the sun gear S2, to the sun gear S1 that is a rotary element close to the carrier C1 (ring gear R2) to which one output shaft Out1 is connected, and to the sun gear S2 that is a rotary element close to the ring gear R1 (carrier C2) to which the sun gear S3 of the other differential unit 6 (G3) is connected, and one motor/generator MG1 and the other motor/generator MG2 are connected respectively.

In the alignment chart of FIG. 22, the other output shaft Out2 is connected to the ring gear R3 of the other differential unit 6 (G3) located on the far end from the sun gear S3 of the other differential unit 6 (G3) that is connected to the ring gear R1 (carrier C2) of one differential unit 5 (G1 and G2), and also in the same alignment chart of FIG. 22, the carrier R3 interposed between both ends of the other differential unit 6 (G3) is fixed onto the casing 1.

As for the transmission unit shown in FIG. 21, by changing the rotational speed of the motor/generators MG1 and MG2 within a range indicated by the bold arrows in the alignment chart in FIG. 22, a mutual connection point for one differential unit 5 (G1 and G2) and the other differential unit 6 (G3), a mutual connection point for one differential unit 5 (G1 and G2) and third differential unit 10 (G4), a connection point (carrier C4) for one output shaft Out1, as well as a connection point (ring gear R3) for the other output shaft Out2, change their rotational speed within the range indicated by the bold arrows, and thus the rotation of the motor/generators MG1 and MG2 may be distributed and output to both output shafts Out1 and Out2.

Figure 23:
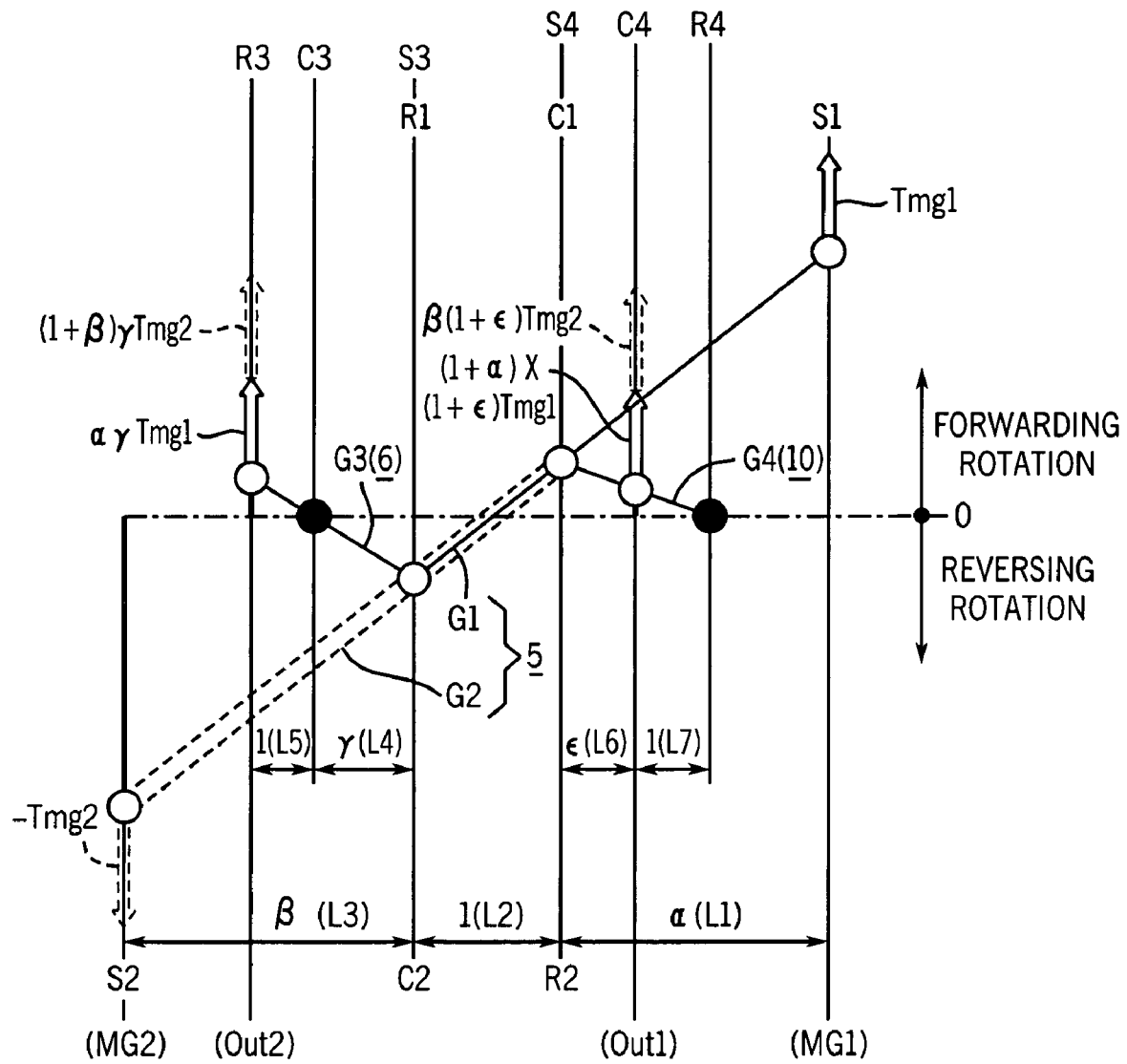
FIG. 23 is an alignment chart wherein vectors are added to the alignment chart of FIG. 22 for the explanation of the behaviors of the transmission.

In the meanwhile, based on the vector indicated in FIG. 23, the same as in the alignment chart in FIG. 22, the manner by which torque from the motor/generators MG1 and MG is transmitted to the output shafts Out1 and Out2 is explained below. As shown by the alignment charts in FIG. 22 and FIG. 23, wherein L1 is the distance between the sun gear S1 to which one motor/generator MG1 is connected, and a mutual connection point for one differential unit 5 (G1 and G2) and the third differential unit 10 (G4), L2, is the distance between this mutual connection point and a mutual connection point for one differential unit 5 (G1 and G2) and the other differential unit 6 (G3), L3 is the distance between this mutual connection point and the sun gear S2 to which the other motor/generator MG2 is connected, and with regard to the other differential unit 6, L4 is the distance between the carrier C3 and the sun gear S3, L5 is the distance between the carrier C3 and the ring gear R3, with regard to the third differential unit 10, L6 is the distance between the carrier C4 and the sun gear S4, L7 is the distance between the carrier C4 and the ring gear R4; given $\alpha=L1/L2$, $\beta=L3/L2$, $\gamma=L4/L5$, $\epsilon=L6/L7$ when one motor/generator MG1 outputs positive torque TMg1 as shown in FIG. 23, positive torque $(1+\alpha)(1+\epsilon)$ Tmg1 is generated on one output shaft Out1 and positive torque $\alpha\cdot\gamma\cdot$Tmg1 is generated on the other output shaft Out2, and when the other motor/generators MG2 outputs negative torque $-$Tmg2 as shown in FIG. 23, then positive torque $\beta(1+\epsilon)$Tmg is generated on one output shaft Out1, and positive torque $(1+\beta)\gamma\cdot$Tmg2 is generated on the other output shaft Out2 . Therefore, due to the Tmg1 and $-$Tmg2 torque of the motor/generators MG1 and MG2, respectively, on one output shaft Out1, a positive torque $(1+\alpha)(1+\epsilon)$Tmg1$+\beta(1+E)$Tmg2 larger than those of each embodiment shown in FIG. 1 through FIG. 20 is applied, and on the other output shaft Out2, the same positive torque $\alpha\cdot\gamma\cdot$Tmg1$+(1+\beta)\gamma\cdot$Tmg2 as those in each embodiment shown in FIG. 1 through FIG. 20 is applied, and thus, same directional torque may be output from both output shafts Out1 and Out2.

FIG. 24 is an explanatory figure showing the relational coefficients during the above power transmission between the torque Tmg1, as well as the number of revolutions Nmg1 of the motor/generator MG1 and the torque Tout1 and Tout2, as well as the number of revolutions Nout1 and Nout2 of the output shafts Out1 and Out2, and also showing the transmission between the torque Tmg2, as well as the number of revolutions Nmg2 of the motor/generator MG2 and the torque Tout1 and Tout2, as well as the number of revolutions Nout1 and Nout2 of the output shafts Out1 and Out2; furthermore FIG. 24 also states the torque Tout1 and Tout2 generated from the output shafts Out1 and Out2 by the motor/generator torque Tmg1 and Tmg2, along with the number of revolutions Nmg1 and Nmg2 of the motor/generators MG1 and MG2 determined by the number of revolutions of the output shafts Nout1 and Nout2 at that moment.

Herein, when an equal value is given to the torque Tmg1 and Tmg2 of both motor/generators MG1 and MG2, for the purpose of explaining the conditions whereby the torque Tout1 and Tout 2 of both output shafts Out1 and Out2 become equal, it is necessary to establish $(1+\alpha)(1+\epsilon)$Tmg1$+\beta(1+\epsilon)$Tmg2$=\alpha\cdot\gamma\cdot$Tmg1$+(1+\beta)\gamma\cdot$Tmg2; however, currently Tmg1=Tmg2, so it is acknowledged that the distance ratio $\alpha$, $\beta$, and $\gamma$, respectively, in said one differential unit 5 (G1 and G2) and in the other differential unit 6 (G3) as well as in the third differential unit 10 (G4) have to be determined so as to obtain, $\alpha\gamma-(1+\alpha)(1+\epsilon)\approx\beta(1+\epsilon)-(1+\beta)\gamma$.

Then, as shown in FIG. 24, wherein Nmg1 and Nmg2 are the number of revolutions of the motor/generators MG1 and MG2, and Nout1 and Nout2 are the number of revolutions of both output shafts Out1 and Out2, yielding, Nout1=$\{1/(1+\beta)\}\cdot$Nmg2 and Nout2=$(1/\alpha\gamma)\cdot\{(1+\epsilon)\cdot$Nmg1$-(1+\alpha+\epsilon)\cdot$Nout1.

Thus, the revolution Nout1 of one output shaft Out1 can only be set according to the number of revolutions Nmg2 of the other motor/generator MG2, whereas the number of revolutions Nout2 of the other output shaft Out2 can be set not only according to the number of revolutions Nout1 of one output shaft Out1, but also according to the number of revolutions Nmg1 of one motor/generator MG1. Therefore, the number of revolutions Nout1 and Nout2 of both output shafts Out1 and Out2, respectively, may be controlled independently.

Additionally, when the number of revolutions Nout2 of the other output shaft Out2 is set at zero, automatically the number of revolutions Ngm2 of the motor/generator MG2 also yields zero, and in this case, as judged from FIG. 24, $Tout2=\{\alpha\gamma/(1+\epsilon)\}\cdot Tmg1+(1+\beta)\cdot Tmg2$ is obtained, and therefore, even if the output of the motor/generator MG2 is zero, it is still capable of contributing to increasing the output of output shaft Out2, and moreover, $Tout1=\{(1+\alpha+\epsilon)/(1+\epsilon)\}\cdot Tmg1$ is obtained, and therefore, the torque Tout1 of the output shaft Out1 becomes controllable only by the motor/generator MG1, and the output shaft torque Tout2 can be adjusted by the motor/generator torque Tmg2, and thus the torque Tout1 and Tout2 of both output shafts Out1 and Out2 may be controlled arbitrarily.

As a result, the drive power distribution of both output shafts Out1 and Out2 may be changed arbitrarily from 0% to 100%, permitting active drive power distribution control of the front/rear wheels of four-wheel-drive vehicles to enhance road handling abilities, thus being extremely useful for enhancing the running stability of vehicles, due to the drive power distribution control of the left/right wheels.

According to the transmission of the present invention, one differential unit 5 (planetary gear group G1 and G2) and the other differential unit 6 (planetary gear group G3), as well as third differential unit 10 (planetary gear group G4) are coaxially located in parallel as shown in FIG. 21, and the connections among the rotary elements of these differential units, and the connections for both motor/generators MG1 and MG2, as well as for both output shafts Out1 and Out2 to these rotary elements, are the connections described above, so that the rotation of both motor/generators MG1 and MG2 is distributed and output to both output shafts Out1 and Out2 under deceleration by both differential units 5 and 6, 10, so that both motor/generators MG1 and MG2 are able to be coaxially placed to differential units 5, 6, 10 that are coaxially located in parallel, and thus the problem of radially enlarging a transmission including both motor/generators MG1 and MG2 may be avoided.

By adopting a structure wherein motor/generators MG1 and MG2 are placed together so as to be coaxially located, and axially on one end, one differential unit 5 (planetary gear group G1 and G2) and the third differential unit 10 (planetary gear group G4) are coaxially located, at the same time, from the one end, one output shaft Out1 is extended coaxially, and further axially on the other end of the motor/generators MG1 and MG2 placed together, the other differential unit 6 (planetary gear group G3) is coaxially located, and at the same time, from the other end, the other output shaft Out2 is coaxially extended; thus, the effect of the action related to said radial downsizing becomes more significant.

As shown in FIG. 24, because the rotation of both motor/generators MG1 and MG2 is distributed and output to both output shafts Out1 and Out2 while the rotation is reduced by both differential units 5 and 6, 10, a large reduction ratio may be set according to the combination of both differential units 5 and 6, 10, so that even if a high-power motor that is rotatable at high speed is required, the rotation from the same motors is output, assuring a reduction in the required number of revolutions, and thus, also applicable to a system in which such high-power motor is used, without having any problems or restrictions in use.

Moreover, in the present embodiment, in the event of connecting one output shaft Out1 to the rotary elements (carrier C1 and ring gear R2) of one differential unit 5, without connecting them directly because the connection was made through the third differential unit 10 (fourth planetary gear group G4) being a gear reduction mechanism, as previously stated, the torque Tout1 to one output shaft Out1 may be larger that those in each embodiment shown in FIG. 1 through 20.

Figure 25:
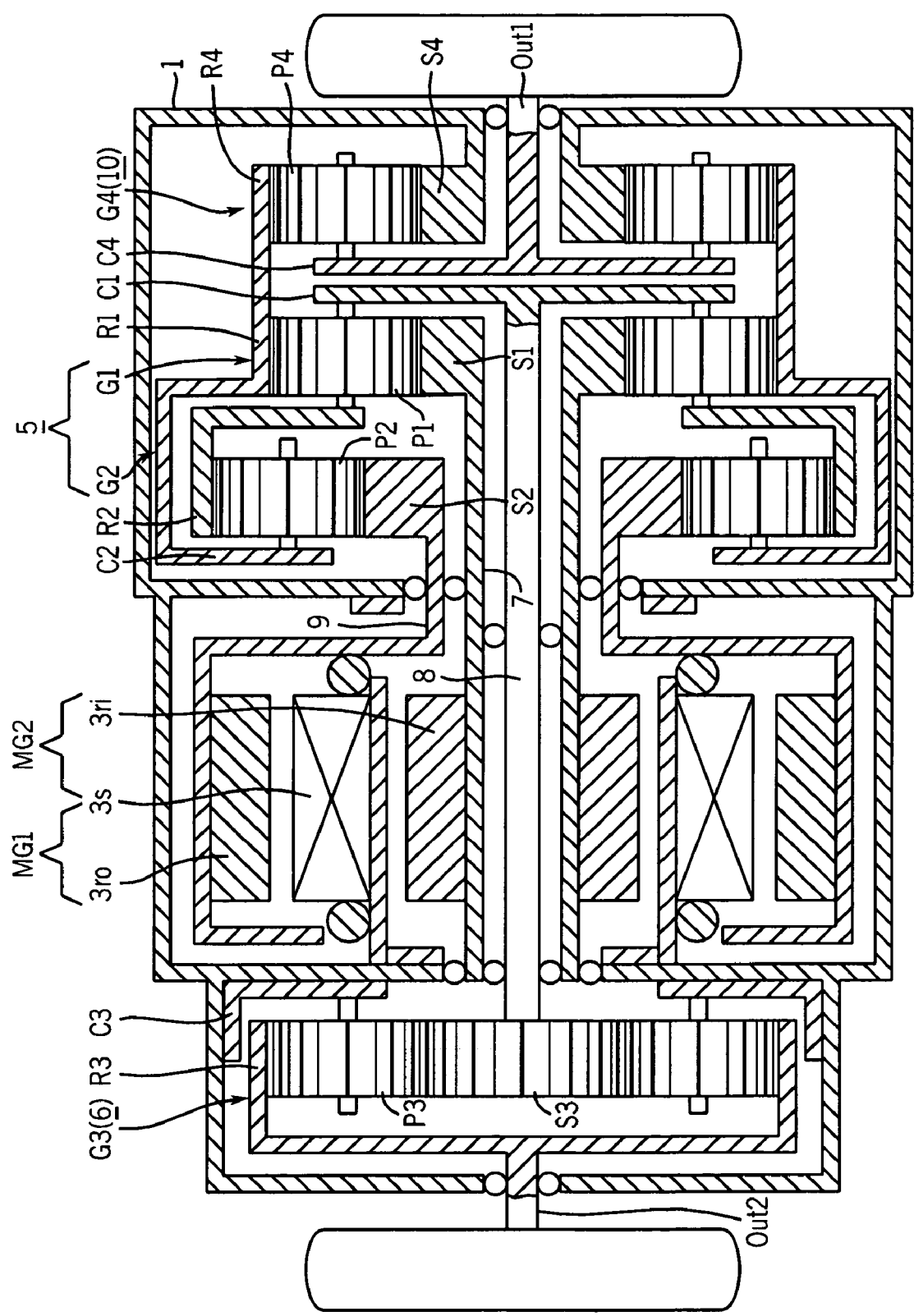
FIG. 25 is an outline drawing showing a concept of a transmission in yet another embodiment of the present invention.
Figure 26:
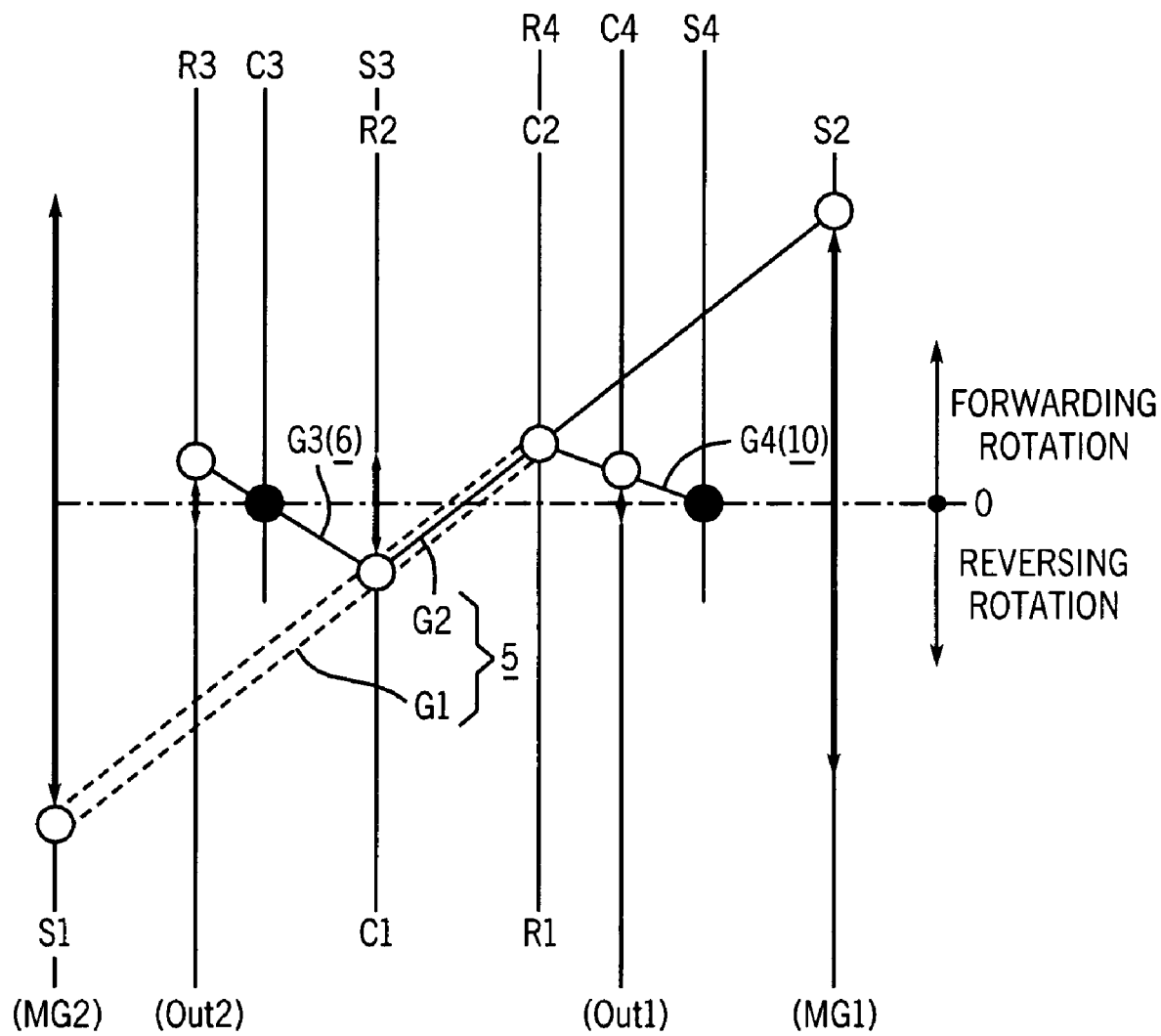
FIG. 26 is an alignment chart of a transmission in the same embodiment.

In the embodiment shown in FIG. 25 and FIG. 26, as represented in the outline drawing in FIG. 25, the outside motor/generator is regarded as one motor/generator MG1, and the inside motor/generator is regarded as the other motor/generator MG2, and one differential unit 5 is comprised by correlating a first and a second single-pinion planetary gear group G1 and G2 as in FIG. 21, and in addition, the other differential unit 6 is comprised of a third single-pinion planetary gear group G3 as in FIG. 21. However, in the event of connecting one differential unit 5 to one output shaft Out1 through the third differential unit 10 comprising a fourth planetary gear group G4, the same connection is made as described below.

That is, the ring gear R1 of the first planetary gear group G1 is connected to the ring gear R4 of a fourth planetary gear group G4, the sun gear S4 of the fourth planetary gear group G4 is fixed onto the casing 1, and by connecting one output shaft Out1 to the carrier C4 of the fourth planetary gear group G4, the connection for the output shaft Out1 is made to the ring gear R1 (carrier C2) of one differential unit 5 through the third differential unit 10 (fourth planetary gear group G4).

A transmission of the present embodiment having such a structure is found in FIG. 26 represented by an alignment chart, and although the rotary members to be assigned differ slightly from the case in FIG. 22, the chart in FIG. 26 is similar to the alignment chart of FIG. 22, and therefore, similar to the embodiments in FIG. 21 through FIG. 24, the number of revolutions Nout1 and Nout2 of both output shafts Out1 and Out2, respectively, may be controlled independently, and at the same time, the torque Tout1 and Tout2 of both output shafts Out1 and Out2 are arbitrarily controllable, and the drive power distribution of both output shafts Out1 and Out2 may be changed arbitrarily from 0% to 100%, permitting an active drive power distribution control of the front/rear wheels of four-wheel-drive vehicles to enhance road handling abilities, thus being extremely useful for enhancing the running stability of vehicles, due to the drive power distribution control of the left/right wheels.

According to the transmission of the present invention, one differential unit 5 (planetary gear group G1 and G2) and the other differential unit 6 (planetary gear group G3) as well as third differential unit 10 (planetary gear group G4) are coaxially located in parallel as shown in FIG. 25, and the connections among the rotary elements of these differential units, and the connections of both motor/generators MG1 and MG2, as well as both output shafts Out1 and Out2, to these rotary elements are the connections described above, so that the rotation of both motor/generators MG1 and MG2 is distributed and output to both output shafts Out1 and Out2 under deceleration by both differential units 5 and 6, 10, so that both motor/generators MG1 and MG2 are able to be coaxially placed to differential units 5, 6, 10 that are coaxially located in parallel, and thus the problem of radially enlarging a transmission including both motor/generators MG1 and MG2 may be avoided.

By adopting a structure wherein motor/generators MG1 and MG2 are placed together so as to be coaxially located, and axially on one end, one differential unit 5 (planetary gear group G1 and G2) and the third differential unit 10 (planetary gear group G4) are coaxially located, and at the same time, from said one end, one output shaft Out1 is extended coaxially, and further axially on the other end of the motor/generators MG1 and MG2 placed together, the other differential unit 6 (planetary gear group G3) is coaxially located, and at the same time, from the other end, the other output shaft Out2 is coaxially extended, and thus, the effect of the action related to said radial downsizing becomes more significant.

Because the rotation of both motor/generators MG1 and MG2 is distributed and output to both output shafts Out1 and Out2 while the rotation is reduced by both differential units 5 and 6, 10, a large reduction ratio may be set according to the combination of both differential units 5 and 6, 10, so that even if a high-power motor that is rotatable at high speed is required, the rotation from the motors is output, assuring a reduction in the required number of revolutions, and thus it is also applicable to a system in which such high-power motor is used, without having any problems or restrictions in use.

Moreover, in the present embodiment, in the event of connecting one output shaft Out1 to the rotary elements (ring gear R1 and carrier C2) of one differential unit 5, without connecting them directly, because the connection was made through the third differential unit 10 (fourth planetary gear group G4) that is a gear reduction mechanism, the torque Tout1 to one output shaft Out1 may be larger than those in each embodiment shown in FIG. 1 through 20.

Figure 27:
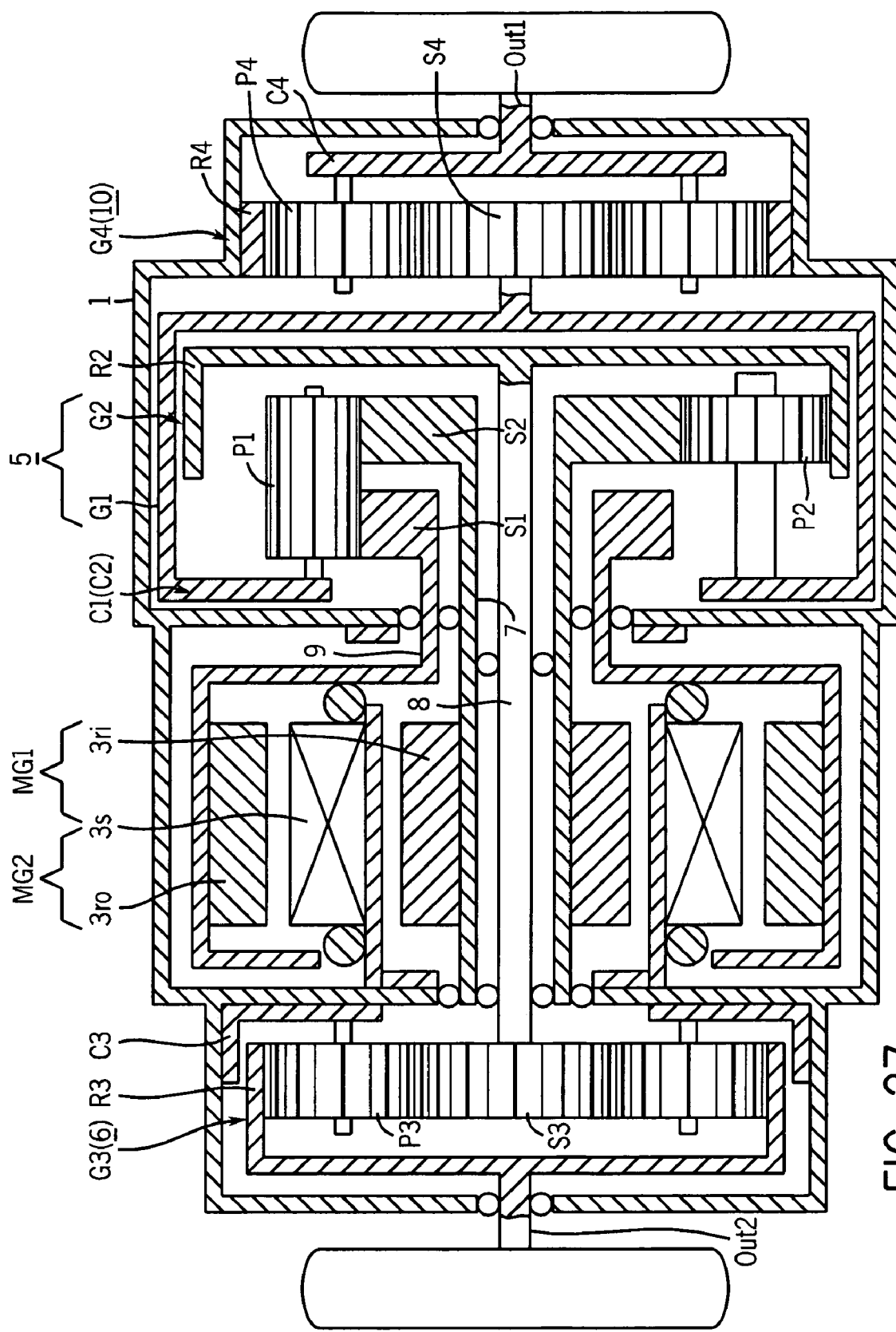
FIG. 27 is an outline drawing showing a concept of a transmission in yet another embodiment of the present invention.
Figure 28:
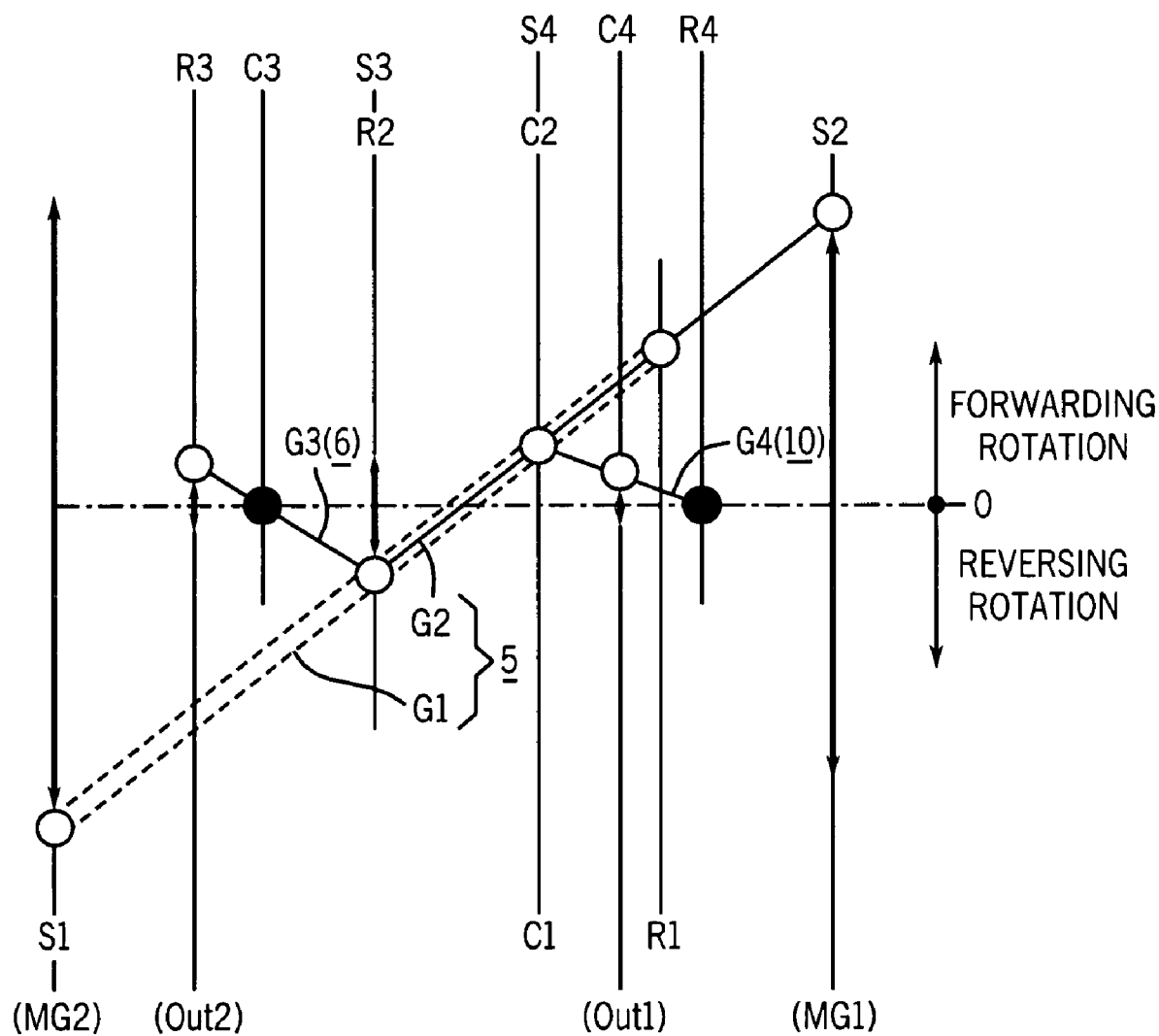
FIG. 28 is an alignment chart of a transmission in the same embodiment.

In the embodiment shown in FIG. 27 and FIG. 28, as represented in the outline drawing of FIG. 27, one differential unit 5 is comprised of a first planetary gear group G1 of the single-pinion planetary gear group and a second planetary gear group G2 of the single-pinion planetary gear group, the other differential unit 6 is comprised of a third planetary gear group G3 of the single-pinion planetary gear group, and the third differential unit 10 is comprised of a fourth planetary gear group of the single-pinion planetary gear group. In order to construct one differential unit 5 comprising the first planetary gear group G1 of the single-pinion planetary gear group and second planetary gear group G2 of the single-pinion planetary gear group, the pinion P1 of the first planetary gear group G1 is also to be engaged to the sun gear S2 of the second planetary gear group G2, and the pinions P1 and P2 of the first planetary gear group G1 and second planetary gear group G2, respectively, are rotatably supported by the common carrier C1 (C2).

Then, instead of directly connecting to one output shaft Out1, the common carrier C1 (C2) is connected to the output shaft Out1, as described below, through the third differential unit 10 comprising the fourth planetary gear group G4. That is, the common carrier C1 (C2) is connected to the sun gear S4 of a fourth planetary gear group G4, and the ring gear R4 of a fourth planetary gear group G4 is fixed onto the casing 1, and one output shaft Out1 is connected to the carrier C4 of a fourth planetary gear group G4. The ring gear R2 of the second planetary gear group G2 is connected to the sun gear S3 of the third planetary gear group G3 by the center shaft 8, and the other motor/generator MG2 is connected to the sun gear S2 of the second planetary gear group G2 through the hollow shaft 9 (in the present embodiment, the outside motor/generator is regarded as MG2, and the inside motor/generator is regarded as MG1), and one motor/generator MG1 is connected to the sun gear S1 of the first planetary gear group G1 through the hollow shaft 7. The carrier C3 of the third planetary gear group G3 is fixed and the ring gear R3 of the third planetary gear group G3 is connected to the other output shaft Out2.

The transmission of the present embodiment with such a structure is found in FIG. 28 represented by an alignment chart, although the rotary members to be assigned differ slightly from the case in FIG. 22, the chart in FIG. 28 is similar to the alignment chart of FIG. 22, and therefore, similar to the embodiments in FIG. 21 through FIG. 28, the number of revolutions Nout1 and Nout2 of both output shafts Out1 and Out2, respectively, may be controlled independently, and at the same time, the torque Tout1 and Tout2 of both output shafts Out1 and Out2 are arbitrarily controllable, and the drive power distribution of both output shafts Out1 and Out2 may be changed arbitrarily from 0% to 100%, permitting an active drive power distribution control of the front/rear wheels of four-wheel-drive vehicles to enhance the road abilities, thus being extremely useful for enhancing the running stability of vehicles, due to the drive power distribution control of the left/right wheels.

According to the transmission of the present invention, one differential unit 5 (planetary gear group G1 and G2) and the other differential unit 6 (planetary gear group G3) as well as third differential unit 10 (planetary gear group G4) are coaxially located in parallel as shown in FIG. 27, and the connections among the rotary elements of these differential units, and the connections of both motor/generators MG1 and MG2, as well as both output shafts Out1 and Out2, to these rotary elements are the connections described above, so that the rotation of both motor/generators MG1 and MG2 is distributed and output to both output shafts Out1 and Out2 under deceleration by both differential units 5 and 6, 10, and so that both motor/generators MG1 and MG2 are able to be coaxially placed to differential units 5, 6, 10 that are coaxially located in parallel, and thus the problem of radially enlarging a transmission including both motor/generators MG1 and MG2 may be avoided.

By adopting a structure wherein motor/generators MG1 and MG2 are placed together so as to be coaxially located, axially on one end, one differential unit 5 (planetary gear group G1 and G2) and third differential unit 10 (planetary gear group G4) are coaxially located, and at the same time, from one end, one output shaft Out1 is extended coaxially, and further axially on the other end of the motor/generators MG1 and MG2 placed together, the other differential unit 6 (planetary gear group G3) is coaxially located, and at the same time, from the other end, the other output shaft Out2 is coaxially extended, and thus, the effect of the action related to said radial downsizing becomes more significant.

Because the rotation of both motor/generators MG1 and MG2 is distributed and output to both output shafts Out1 and Out2 while the rotation is reduced by both differential units 5 and 6, 10, a large reduction ratio may be set according to the combination of both differential units 5 and 6, 10, so that even when a high-power motor that is rotatable at high speed is required, the rotation from the same motors is output, assuring a reduction in the required number of revolutions, and thus, it is also applicable to a system in which such high-power motor is used, without having any problems or restrictions in use. Moreover, in the present embodiment, in the event of connecting one output shaft Out1 to the rotary elements (carrier C1 and carrier C2) of one differential unit 5, without connecting them directly, because the connection was made through third differential unit 10 (fourth planetary gear group G4) that is a gear reduction mechanism, the torque Tout1 to one output shaft Out1 may be larger than those in each embodiment shown in FIG. 1 through 20.

Figure 29:
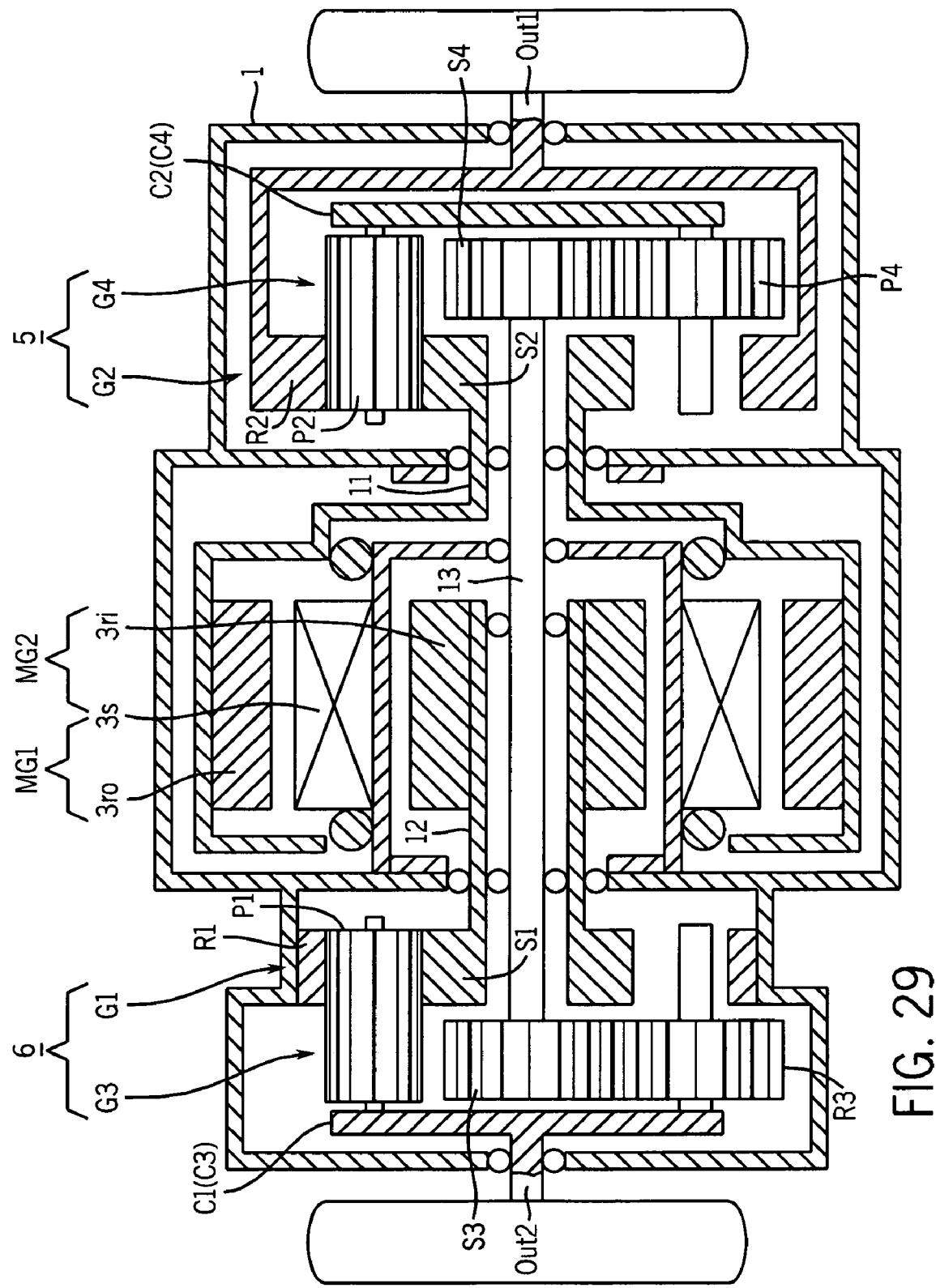
FIG. 29 is an outline drawing showing a concept of a transmission in yet another embodiment of the present invention.
Figure 30:
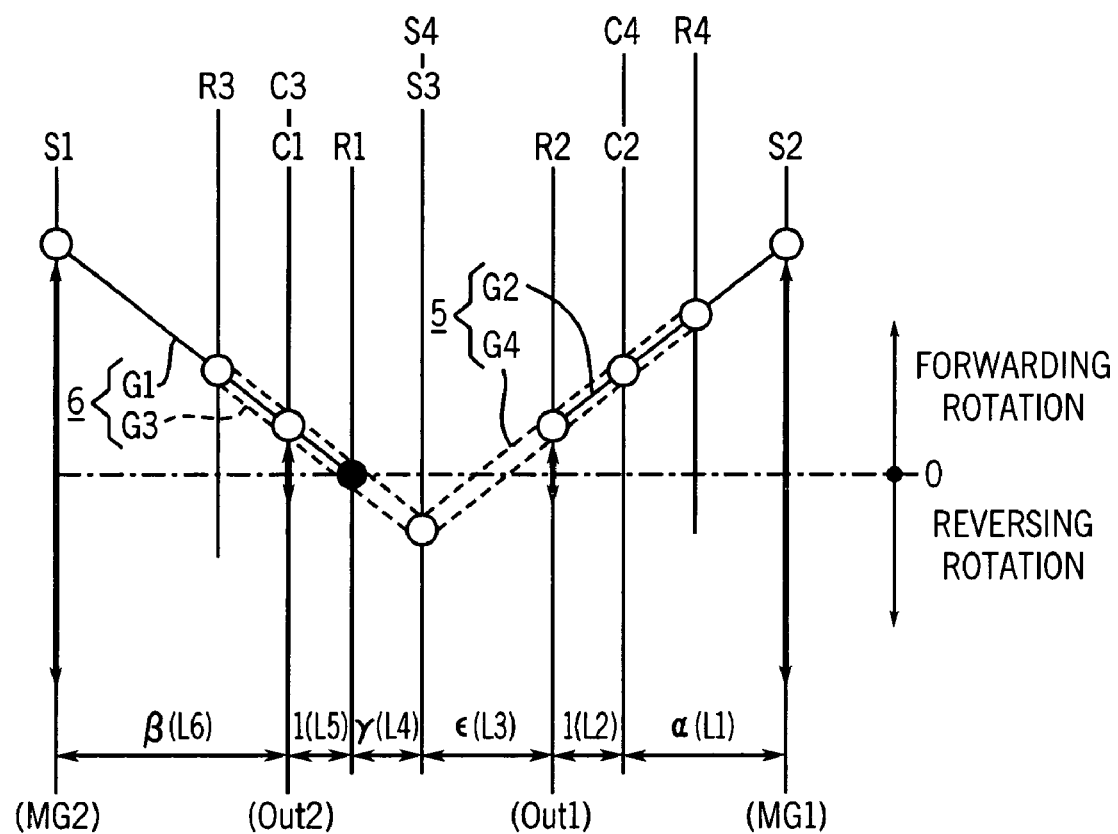
FIG. 30 is an alignment chart of a transmission in the same embodiment.
Figure 31:
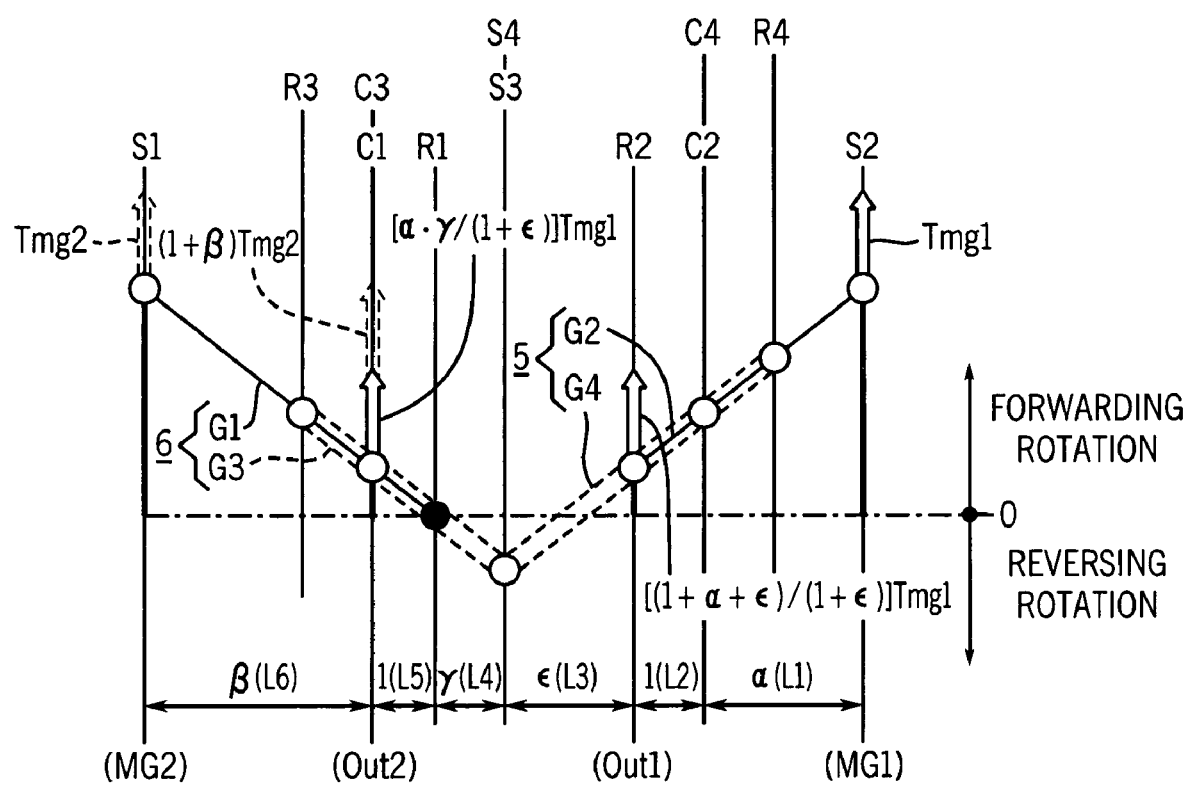
FIG. 31 is an alignment chart wherein vectors are added to the alignment chart of FIG. 30 for the explanation of the actions of the transmission.

FIG. 29 through FIG. 32 further show a transmission according to the other embodiment of the present invention, FIG. 29 is the outline drawing, FIG. 30 and FIG. 31 are alignment charts, and FIG. 32 is an explanatory figure for the correlation coefficients between the inputs and outputs. To explain the structure based on the outline drawing of FIG. 29, axially on the right side (left/right in the drawing) within the casing 1, two (i.e. a second and a fourth) planetary gear groups, G2 and G4, are coaxially accommodated in parallel, axially on the left side (left/right in the drawing) within the casing 1, and a first planetary gear group G1 and a third planetary gear group G3 are accommodated so as to coaxially locate all of these planetary gear groups G1 and G2,G3,G4.

The second and fourth planetary gear groups G2 and G4 are located so as to position the second planetary gear group G2 on the left side in the figure, the first and third planetary gear groups G1 and G3 are located so as to position the first planetary gear group G1 on the right side in the figure, and between the second and third planetary gear group G2 and G3, one motor/generator MG1 and the other motor/generator MG2 are interposed coaxially. The motor/generators MG1 and MG2 have a common stator 3s fixed onto the casing 1, and serve as a composite current dual-layer motor equipped with a rotor 3ro of one motor/generator MG1 at the outer circumference and a rotor 3ri of the other motor/generator MG2 at the inner circumference. Instead of comprising the motor/generators MG1 and MG2 as one unit to serve as a composite current dual-layer motor, it may also be comprised as an independent unit having an individual stator. However, in any case, the motor/generators MG1 and MG2 are to be coaxially located together, and at the same time, located coaxially with the planetary gear groups G1 and G2, G3, G4.

The second planetary gear group G2 and the fourth planetary gear group G4 construct one differential unit 5 in the present invention, the first planetary gear group G1 and the third planetary gear group G3 construct the other differential unit 6 in the present invention, and these first planetary gear group G1, second planetary gear group G2, third planetary gear group G3, and fourth planetary gear group G4, respectively, are regarded as a single-pinion planetary gear group comprising a sun gear S1, S2, S3, S4, a ring gear R1, R2, R3, R4, a pinion P1, P2, P3, P4 and a carrier C1, C2, C3, C4 rotatably supporting their pinions. Herein, to construct one differential unit 5 comprising the second planetary gear group G2 and the fourth planetary gear group G4, pinions P2 and P4 of these planetary gear groups G2 and G4 are to be rotatably supported by the common carrier C2 (C4), and in order to construct the other differential unit 6 comprising the first planetary gear group G1 and the third planetary gear group G3, the pinions P1 and P3 of these planetary gear groups G1 an dG3 are to be rotatably supported by the common carrier C1(C3).

Then, the ring gear R2 of the second planetary gear group G2 is connected to one output shaft Out1, and the common carrier C1 (C3) of the first planetary gear group G1 and the third planetary gear group G3 is connected to the other output shaft Out2. In addition, one motor/generator MG1 is connected to the sun gear S2 of the second planetary gear group G2 through a hollow shaft 11, and the other motor/generator MG2 is connected to the sun gear S1 of the first planetary gear group G1 through a hollow shaft 12. A center shaft 13 is inserted into the hollow shafts 11 and 12 and, the sun gear S4 of the fourth planetary gear group G2 and the sun gear S3 of the third planetary gear group G3 are connected together through the center shaft 13. The ring gear R1 of the first planetary gear group G1 is fixed onto the casing 1.

One output shaft Out1 protruding coaxially and rotatably from the end (right end in FIG. 1) of the casing 1, where the second planetary gear group and the fourth planetary gear groups G2 and G4 are located, is to be connected to a differential gear unit for rear left/right wheels or to a differential gear unit for front left/right wheels, not illustrated herein. The other output shaft Out2 protruding coaxially and rotatably from the end (left end in FIG. 1) of the casing 1 opposite to the protruding side of the above one output shaft Out1 is connected, for example, to a differential gear unit for rear left/right wheels or to a differential gear unit for front left/right wheels, not illustrated herein.

The above transmission unit comprised as shown in FIG. 29 can be represented in an alignment chart, as in FIG. 30, where the vertical axis in the figure indicates the rotational speeds (0 is the reference, the upward direction in the figure is the forwarding rotational speed and the downward direction is the reversing rotational speed) of the rotary elements constituting the planetary gear groups G2 and G4 (one differential unit 5) and the planetary gear groups G1 and G3 (the other differential unit 6), while the horizontal axis indicates the distance ratio among the rotary elements constituting the planetary gear groups G2 and G4 (one differential unit 5) and the planetary gear groups G1 and G3 (the other differential unit 6). As previously described, the carriers C2 and C4 are mutually integrated and the ring gear R2 is connected to one output shaft Out1, so that one differential unit 5 comprising the second planetary gear group G2 and the fourth planetary gear group G4 is illustrated as one rod of combined levers indicated by the same numerical mark as G2 and G4 in FIG. 30, and the order of the rotational speeds (whether it is in the ascending order or descending order depends on the speed change status) of the rotary elements constituting the same differential unit 5 is: sun gear S2, ring gear R4 (a hypothetical ring gear of a fourth planetary gear group G4 that does not exist in reality), common carrier C2(C4), ring gear R2, and sun gear S4, in that order.

With regard to the other differential unit 6 comprising the first planetary gear group G1 and the third planetary gear group G3, as previously described, the carriers C1 and C3 are mutually integrated and connected to the other output shaft Out2 while the ring gear R1 is fixed, and thus, illustrated as one rod of combined levers indicated by the same numerical mark as G1 and G3 in FIG. 30, and the order of the rotational speeds (whether it is in the ascending order or descending order depends on the speed change status) of the rotary elements constituting the said differential unit 6 is: sun gear S3, ring gear R1 (a hypothetical ring gear of the first planetary gear group G1 that does not exist in reality), common carrier C1(C3), ring gear R3, and sun gear S1, in that order.

In the alignment chart in FIG. 30, among the sun gear S2 and the sun gear S4 of one differential unit 5 (G2,G4) located at each end, in the direction of the order of the rotational speeds, the former sun gear S2 is connected to one motor/generator MG1, the latter sun gear S4 is connected to the sun gear S3 of the other differential unit 6 (G1,G3), and one output shaft Out1 is connected to the ring gear R2 between the common carrier C2(C4) of one differential unit 5 (G2, G4) and the mutual connection point of both differential units 5 and 6. Moreover, in the same alignment chart in FIG. 30, among the sun gear S1 and the sun gear S4 of the other differential unit 6 (G1, G3) located at each end, in the direction of the order of the rotational speeds, the former sun gear S1 is connected to the other motor/generator MG2, and the latter sun gear S4 is connected to the sun gear S4 of one differential unit 5 (G2, G4). Then, the other output shaft Out2 is connected to the common carrier C1 (C3) of the other differential unit 6 (G1,G3), and the ring gear R1 located between the common carrier C1(C3), and the mutual coupling point of both differential units 5 and 6 in the alignment chart is fixed.

As for the transmission unit shown in FIG. 29, by changing the rotational speed of the motor/generators MG1 and MG2 within a range indicated by the bold arrows in the alignment chart in FIG. 30, a mutual connection point (sun gear S3,S4) of one differential unit 5 (G2,G4) and the other differential unit 6 (G1,G3), a connection point (ring gear R2) of one output shaft Out1 and a common carrier (C1,C3) of the other output shaft Out2, respectively, change their rotational speed within the range indicated by the bold arrows, and thus the rotation of the motor/generators MG1 and MG2 may be distributed and output for both output shafts Out1 and Out2.

Based on the vector indicated in FIG. 31 that is the same as in the alignment chart in FIG. 30, the manner by which torque from the motor/generators MG1 and MG is transmitted to the output shafts Out1 and Out2 is explained below. As shown in the alignment charts in FIG. 30 and FIG. 31, wherein L1 is the distance between the sun gear S2 to which one motor/generator MG1 of one differential unit 5 (G2,G4) is connected and the common carrier C2(C4); L2 is the distance between the common carrier C2(C4) and the ring gear R2 to which one output shaft Out1 is connected; L3 is the distance between the ring gear R2 to which the same one output shaft Out1 is connected and a mutual connection point of both differential units 5 and 6 (sun gears S3,S4), and with regard to the other differential unit 6 (G1, G3), L4 is the distance between the fixed ring gear R1 and the mutual connection point (sun gear S3,S4) of both differential units 5 and 6; L5 is the distance between the same fixed ring gear R1 and the common carrier C1(C3) to which the other output shaft Out2 is connected; L6 is the distance between the common carrier C1(C3) to which the same the other output shaft Out2 is connected and the sun gear S1 to which the other motor/generator MG2 is connected; given $\alpha=L1/L2$, $\beta=L6/L5$, $\gamma=L5/L4$, $\epsilon=L3/L2$ when one motor/generator MG1 outputs positive torque Tmg1 as shown in FIG. 31, then positive torque $(1+\alpha+\epsilon)$Tmg1 is generated on one output shaft Out1, and on the other output shaft Out2, positive torque $\alpha\cdot\gamma(1+\epsilon)$Tmg1 is generated, and when the other motor/generator MG2 outputs positive torque Tmg2 as shown in FIG. 31, then positive torque $(1+\beta)$Tmg2 is generated on the other output shafts Out2, while the torque to one output shaft Out1 becomes $0\cdot$Tmg2=0, hence the torque is not transmitted.

Therefore, due to the torque Tmg1 and Tmg2 of the motor/generators MG1 and MG2 respectively, positive torque $(1+\alpha+\epsilon)/(1+\epsilon)\}$Tmg1+$0\cdot$Tmg2 is applied on one output shaft Out1, and positive torque $\{\alpha\gamma/(1+\epsilon)\}$Tmg1+$(1+\beta)$Tmg2 is applied on the other output shaft Out2, and thus, same directional torque may be output from both output shafts Out1 and Out2.

FIG. 32 is an explanatory figure showing the relational coefficients during the above power transmission between the torque Tmg1, as well as the number of revolutions Nmg1 of the motor/generator MG1 and the torque Tout1 and Tout2, as well as the number of revolutions Nout1 and Nout2 of the output shafts Out1 and Out2, and the transmission between the torque Tmg2, as well as the number of revolutions Nmg2 of the motor/generator MG2, and the torque Tout1 and Tout2, as well as the number of revolutions Nout1 and Nout2 of the output shafts Out1 and Out2; FIG. 32 also states the torque Tout1 and Tout2 generated from the output shafts Out1 and Out2 by the motor/generator torque Tmg1 and Tmg2, along with the number of revolutions Nmg1 and Nmg2 of the motor/generators MG1 and MG2 determined by the number of revolutions of the output shafts Nout1 and Nout2 at that moment.

Herein, when an equal value is given to the torque Tmg1 and Tmg2 of both motor/generators MG1 and MG2, for the purpose of explaining the conditions whereby the torque Tout1 and Tout 2 of both output shafts Out1 and Out2 become equal, it is necessary to establish $\{(1+\alpha+\epsilon)/(1+\epsilon)\}$Tmg1+$0\cdot$Tmg2=$\{\alpha\gamma(1+\epsilon)\}$Tmg1+$(1+\beta)$Tmg2; however, currently Tmg1=Tmg2, so it is acknowledged that the distance ratio $\alpha$, $\beta$, $\gamma$, $\epsilon$, respectively, in said one differential unit 5 (G2,G4) and in the other differential unit 6 (G1,G3) have to be determined so as to obtain $\alpha\gamma/(1+\epsilon)-(1+\alpha+\epsilon)/(1+\epsilon)\approx(1+\beta)$ And by determining the output of the motor/generators MG1 and MG2 so as to establish a relation of Tmg1·Nmg1+Tmg2·Nmg2+Tout1·Nout1+Tout2·Nout2=0 between the torque Tmg1 and Tmg2 as well as the number of revolutions Nmg1 and Nmg2 of the motor/generators MG1 and MG2, and the torque Tout1 and Tout2 as well as the number of revolutions Nout1 and Nout2 of both output shafts Out1 and Out2, the drive power distribution to both output shafts Out1 and Out2 become arbitrarily controllable, and thus may be used for a drive power distribution control of the front/rear wheels.

As for the drive power distribution control, as seen in FIG. 32, by setting one of the number of revolutions of both of output shafts Out1 and Out2 at zero, the output from the same output shaft may also becomes zero, and then it becomes possible to output the total output of both motor/generators MG1 and MG2 to the other output shaft. Therefore, by determining the output of the motor/generators MG1 and MG2 so as to establish a relation of Tmg1·Nmg1+Tmg2·Nmg2=Tout1·Nout1+Tout2·Nout2, the drive power distribution of the output shafts Out1 and Out2 may be changed arbitrarily from 0% to 100%, permitting an active drive power distribution control of the front/rear wheels of four-wheel-drive vehicles to enhance the road abilities, and thus being extremely useful for enhancing the running stability of vehicles, due to the drive power distribution control of the left/right wheels.

Moreover, according to the transmission of the present invention, one differential unit 5 (planetary gear group G2, G4) and the other differential unit 6 (planetary gear group G1,G3) are coaxially located in parallel as shown in FIG. 29, and the connections among the rotary elements of these differential units, and the connections of both motor/generators MG1 and MG2, as well as both output shafts Out1 and Out2, to these rotary elements are the connections described above, so that the rotation of both motor/generators MG1 and MG2 is distributed and output to both output shafts Out1 and Out2 under deceleration by both differential units 5 and 6, and so that both motor/generators MG1 and MG2 are able to be coaxially placed to both differential units 5 and 6 that are coaxially located in parallel, and thus the problem of radially enlarging a transmission including both motor/generators MG1 and MG2 may be avoided.

By adopting a structure wherein motor/generators MG1 and MG2 are placed together so as to be coaxially-located as in the present embodiment, axially on one end, one differential unit 5 (planetary gear group G2, G4) is coaxially located, and at the same time, from one end, one output shaft Out1 is coaxially extended, and further axially on the other end of the motor/generators MG1 and MG2 placed together, the other differential unit 6 (planetary gear group G1,G3) is coaxially located, and at the same time, from the other end, the other output shaft Out2 is coaxially extended, and thus, the effect of the action related to said radial downsizing radially more significant.

As seen from said explanation of the action and from FIG. 32, because the rotation of both motor/generators MG1 and MG2 is distributed and output to both output shafts Out1 and Out2 while the rotation is reduced by both differential units 5 and 6, a large reduction ratio may be set according to the combination of both differential units 5 and 6, so that even when a high-power motor that is rotatable at high speed is required, the rotation from the same motors is output, assuring a reduction in the required number of revolutions, and thus it is also applicable to a system in which such high-power motor is used, without having any problems or restrictions in use.

Finally, as previously described, because the rotation of both motor/generators MG1 and MG2 is distributed and output to both output shafts Out1 and Out2 while the rotation is reduced by both differential units 5 and 6, the torque distribution to both output shafts Out1 and Out2 becomes freely controllable according to the output combination of both motor/generators MG1 and MG2; therefore, without having any restrictions in use, it is also applicable to cases in which the torque distribution to a dual output system needs to be freely controlled.

Various embodiments of the invention have been described. These and other embodiments are within the scope of the following claims.

The invention claimed is:

1. A transmission comprising:
   a first differential unit comprising a first set of rotary elements that includes at least four rotary elements;
   a second differential unit comprising a second set of rotary elements that includes at least three rotary elements,
   at least one rotary element in the first set of rotary elements being connected to at least one rotary element in the second set of rotary elements,
   the first differential unit combining with the second differential unit to provide at least two degrees of freedom for the transmission;
   a first motor/generator connected to a first rotary element that is one of the first set of rotary elements;
   a first output shaft connected to a second rotary element that is one of the first set of rotary elements;
   a second motor/generator connected to a third rotary element that is one of the first set of rotary elements;
   a second output shaft connected to a fourth rotary element that is one of the second set of rotary elements or one of the first set of rotary elements;
   the first set of rotary elements including a fifth rotary element that is connected to a rotary element of the second set of rotary elements,
   the second rotary element, which is connected to the first output shaft, not being connected to a rotary element of the second set of rotary elements,
   both the second rotary element and the fifth rotary element being located approximately in a middle in a direction of an order of rotational speeds in a first alignment chart that represents the first differential unit,
   the first rotary element, which is connected to the first motor/generator, being on a first end of the first alignment chart and closer to the second rotary element than the fifth rotary element,
   the third rotary element, which is connected to the second motor/generator, being on a second end of the first alignment chart and closer to the fifth rotary element than the second rotary element.

2. The transmission of claim 1, wherein the first output shaft is directly connected to the second rotary element.

3. The transmission of claim 1,
   wherein the second set of rotary elements includes a sixth rotary element that is connected to the fifth rotary element of the first set of rotary elements,
   wherein with respect to the first differential unit,
      "L1" represents a distance between the first rotary element, which is connected to the first motor/generator, and the second rotary element, which is connected to the first output shaft,
      "L2" represents a distance between the second rotary element and the fifth rotary element, which is connected to a rotary element of the second set of rotary elements, and
      "L3" represents a distance between the fifth rotary element and the third rotary element, which is connected to the second motor/generator,
   wherein with regard to the second differential unit,
      "L4" represents a distance between the sixth rotary element and a fixed rotary element of the second set of rotary elements, and
      "L5" represents a distance between the fixed rotary element of the second set of rotary elements and the fourth rotary element, which is connected to the second output shaft,
   wherein α=L1/L2, β=L3/L2, γ=L4/L5,
   wherein the first differential unit and the second differential unit are configured so as to obtain, $$\alpha\gamma-(1+\alpha)\cong\beta-(1+\beta)\gamma.$$

4. The transmission of claim 2,
   wherein "Tmg1" represents a torque of the first motor/generator,
   wherein "Tmg2" represents a torque of the second motor/generator,
   wherein "Nmg1" represents a number of revolutions of the first motor/generator,
   wherein "Nmg2" represents a number of revolutions of the second motor/generator,
   wherein "Tout1" represents a torque of the first output shaft,
   wherein "Tout2" represents a torque of the second output shaft,
   wherein "Nout1" represents a number of revolutions of the first output shaft,
   wherein "Nout2" represents a number of revolutions of the second output shaft,
   wherein the transmission is configured so that the output of both motor/generators is determined to obtain, $$Tmg1\cdot Nmg1+Tmg2\cdot Nmg2+Tout1\cdot Nout1+Tout2\cdot Nout2=0.$$

5. The transmission of claim 2,
   wherein "Tmg1" represents a torque of the first motor/generator,
   wherein "Tmg2" represents a torque of the second motor/generator,
   wherein "Nmg1" represents a number of revolutions of the first motor/generator,
   wherein "Nmg2" represents a number of revolutions of the second motor/generator,
   wherein "Tout1" represents a torque of the first output shaft,
   wherein "Tout2" represents a torque of the second output shaft, wherein "Nout1" represents a number of revolutions of the first output shaft, wherein "Nout2" represents a number of revolutions of the second output shaft, wherein the transmission is configured so that the output of both motor/generators is determined to obtain, Tmg1·Nmg1+Tmg2·Nmg2=Tout1·Nout1+ Tout2·Nout2.

6. The transmission of claim 2,
wherein the first differential unit includes a first single-pinion planetary gear group and a second single-pinion planetary gear group,
wherein the second differential unit includes a third single-pinion planetary gear group,
wherein the second rotary element, which is connected to the first output shaft, is a carrier of the first planetary gear group and is connected to a ring gear of the second planetary gear group,
wherein a ring gear of the first planetary gear group is connected to a carrier of the second planetary gear group, and is at the same time, connected to a sun gear of the third planetary gear group,
wherein the first rotary element, which is connected to the first motor/generator, is a sun gear of the first planetary gear group,
wherein the third rotary element, which is connected to the second motor/generator, is a sun gear of the second planetary gear group,
wherein a carrier of the third planetary gear group is fixed, and
wherein the fourth rotary element, which is connected to the second output shaft, is a ring gear of the third planetary gear group.

7. The transmission of claim 2,
wherein the first differential unit includes a first single-pinion planetary gear group and a second double-pinion planetary gear group,
wherein the second differential unit includes a third single-pinion planetary gear group,
wherein the second rotary element, which is connected to the first output shaft, is a ring gear of the first planetary gear group and is connected to a ring gear of the second planetary gear group,
wherein a carrier of the first planetary gear group is connected to a carrier of the second planetary gear group, and at the same time, to a sun gear of the third planetary gear group,
wherein the third rotary element, which is connected to the second motor/generator, is a sun gear of the first planetary gear group,
wherein the first rotary element, which is connected to the first motor/generator, a sun gear of the second planetary gear group,
wherein a carrier of the third planetary gear group is fixed, and
wherein the fourth rotary element, which is connected to the second output shaft, is a ring gear of the third planetary gear group.

8. The transmission of claim 2,
wherein the first differential unit includes a first double-pinion planetary gear group and a second single-pinion planetary gear group,
wherein the second differential unit includes a third single-pinion planetary gear group,
wherein the second rotary element, which is connected to the first output shaft, is a carrier of the first planetary gear group and is connected to a carrier of the second planetary gear group,
wherein a ring gear of the first planetary gear group is connected to a ring gear of the second planetary gear group, and at the same time, to a sun gear of the third planetary gear group,
wherein the third rotary element, which is connected to the second motor/generator, is a sun gear of the first planetary gear group,
wherein the first rotary element, which is connected to the first motor/generator, is a sun gear of the second planetary gear group,
wherein a carrier of the third planetary gear group is fixed, and wherein the fourth rotary element, which is connected to the second output shaft, is a ring gear of the third planetary gear group.

9. The transmission of claim 2,
wherein the first differential unit includes a first single-pinion planetary gear group and a second single-pinion planetary gear group,
wherein the second differential unit includes a third single-pinion planetary gear group,
wherein the first rotary element, which is connected to the first motor/generator, is a sun gear of the second planetary gear group,
wherein the first planetary gear group and the second planetary gear group correlate such that a pinion of the first planetary gear group engages the first rotary element,
wherein pinions of the first planetary gear group and pinions of the second planetary gear groups are rotatably supported by the second rotary element, which is a common carrier of the first planetary gear group and the second planetary gear group,
wherein a ring gear of the second planetary gear group is connected to a sun gear of the third planetary gear group,
wherein the third rotary element, which is connected to the second motor/generator, is a sun gear of the first planetary gear group,
wherein a carrier of the third planetary gear group is fixed, and
wherein the fourth rotary element, which is connected to the second output shaft, is a a ring gear of the third planetary gear group.

10. The transmission of claim 2,
wherein the first differential unit includes a first single-pinion planetary gear group and a second single-pinion planetary gear group,
wherein the second differential unit includes a third single-pinion planetary gear group,
wherein the first rotary element, which is connected to the first motor/generator, is a sun gear of the second planetary gear group,
wherein the first planetary gear group and the second planetary gear group correlate such that a pinion of the first planetary gear group engages with the first rotary element,
wherein the second rotary element, which is connected to the first output shaft, is a ring gear of the first planetary gear group,
wherein a ring gear of the second planetary gear group is connected to a sun gear of the third planetary gear group,
wherein the third rotary element, which is connected to the second motor/generator, is a sun gear of the first planetary gear group, wherein a carrier of the third planetary gear group is fixed, and wherein the fourth rotary element, which is connected to the second output shaft, is a a ring gear of the third planetary gear group.

11. The transmission of claim 2, wherein the first differential unit includes a first single-pinion planetary gear group and a second single-pinion planetary gear group, wherein the second differential unit includes a third single-pinion planetary gear group, wherein the third rotary element, which is connected to the second motor/generator, is a sun gear of the second planetary gear group, wherein the first planetary gear group and the second planetary gear group correlate such that a pinion of the first planetary gear group engages with the third rotary element, wherein pinions of the first and the second planetary gear groups are rotatably supported by the second rotary element, which is a common carrier of the first planetary gear group and the second planetary gear group, wherein a ring gear of the first planetary gear group is connected to a sun gear of the third planetary gear group, wherein the first rotary element, which is connected to the first motor/generator, is a sun gear of the first planetary gear group, wherein a carrier of the third planetary gear group is fixed, and wherein the fourth rotary element, which is connected to the second output shaft, is a a ring gear of the third planetary gear group.

12. The transmission of claim 2, wherein the first differential unit includes a first single-pinion planetary gear group and a second single-pinion planetary gear group, wherein the second differential unit includes a third single-pinion planetary gear group, wherein the third rotary element, which is connected to the second motor/generator, is a sun gear of the second planetary gear group, wherein the first planetary gear group and the second planetary gear group correlate such that a pinion of the first planetary gear group engages with the third rotary element, wherein the second rotary element, which is connected to the first output shaft, is a ring gear of the second planetary gear group, wherein a ring gear of the second planetary gear group is connected to a sun gear of the third planetary gear group, wherein the first rotary element, which is connected to the first motor/generator, is a sun gear of the first planetary gear group, wherein a carrier of the third planetary gear group is fixed, and wherein the fourth rotary element, which is connected to the second output shaft, is a a ring gear of the third planetary gear group.

13. The transmission of claim 2, wherein the first differential unit includes a first single-pinion planetary gear group and a second single-pinion planetary gear group, wherein the second differential unit includes a third single-pinion planetary gear group, wherein the third rotary element, which is connected to the second motor/generator, is a sun gear of the second planetary gear group, wherein the first planetary gear group and the second planetary gear group correlate such that a pinion of the first planetary gear group engages with the third rotary element, wherein pinions of the first and the second planetary gear groups are rotatably supported by a common carrier, wherein the second rotary element, which is connected to the first output shaft, is a ring gear of the second planetary gear group, wherein the common carrier is connected to a sun gear of the third planetary gear group, wherein the first rotary element, which is connected to the first motor/generator, is a sun gear of the first planetary gear group, wherein a carrier of the third planetary gear group is fixed, and wherein the fourth rotary element, which is connected to the second output shaft, is a ring gear of the third planetary gear group.

14. The transmission of claim 2, wherein the first differential unit includes a first single-pinion planetary gear group and a second single-pinion planetary gear group, wherein the second differential unit includes a third single-pinion planetary gear group, wherein the first rotary element, which is connected to the first motor/generator, is a sun gear of the second planetary gear group, wherein the first planetary gear group and the second planetary gear group correlate such that a pinion of the first planetary gear group engages with the first rotary element, wherein pinions of the first and the second planetary gear groups are rotatably supported by a common carrier, wherein the second rotary element, which is connected to the first output shaft, is a ring gear of the first planetary gear group, wherein the common carrier is connected to a sun gear of the third planetary gear group, wherein the third rotary element, which is connected to the second motor/generator, is a sun gear of the first planetary gear group, wherein a carrier of the third planetary gear group is fixed, and wherein the fourth rotary element, which is connected to the second output shaft, is a ring gear of the third planetary gear group.

15. The transmission of claim 1, wherein the first differential unit includes a first planetary gear group and a second planetary gear group, wherein the second differential unit includes a third planetary gear group, wherein the first motor/generator is coaxially located with the second motor/generator, wherein the first and second planetary gear groups are coaxially located with the first and second motor/generators on a first side of the first and second motor/generators, wherein the third planetary gear group is coaxially located with the first and second motor/generators on the side opposite to the first side of the first and second motor/generators, wherein the first output shaft is coaxially located with the first and second motor/generators on the first side of the first and second motor/generators, wherein the second output shaft is coaxially located with the first and second motor/generators on the side opposite to the first side of the first and second motor/generators.

16. The transmission of claim 1, wherein
the first motor/generator and the second motor/generator are disposed coaxially.

17. The transmission of claim 16, wherein
the fifth rotary element of the first set of rotary element and a rotary element of the second set of rotary element are connected by a shaft that penetrates through the first motor/generator and the second motor/generator.

18. A transmission comprising:
a first differential unit comprising at least a first rotary element, a second rotary element, a third rotary element, a fourth rotary element and a fifth rotary element;
a second differential unit comprising at least a sixth rotary element, a seventh rotary element and an eighth rotary element, wherein the eighth rotary element of the second differential unit is fixed, the second differential unit being located coaxially with the first differential unit, the first rotary element of the first differential unit being connected to the sixth rotary element of the second differential unit;
a first motor/generator, is connected to the second rotary element of the first differential unit;
a first output shaft, connected to the third rotary element of the first differential unit;
a second output shaft, connected to the sixth rotary element of the second differential unit, the second output shaft being located coaxially with the first output shaft; and
a second motor/generator, connected to a rotary element of the second differential unit other than the sixth rotary element of the second differential unit or the seventh rotary element of the second differential unit;
the fifth rotary element being connected to a rotary element of the second set of rotary elements,
the second rotary element, which is connected to the first output shaft, not being connected to a rotary element of the second set of rotary elements,
both the second rotary element and the fifth rotary element being located approximately in a middle in a direction of an order of rotational speeds in a first alignment chart that represents the first differential unit,
the first rotary element, which is connected to the first motor/generator, being on a first end of the first alignment chart and closer to the second rotary element than the fifth rotary element,
the third rotary element, which is connected to the second motor/generator, being on a second end of the first alignment chart and closer to the fifth rotary element than the second rotary element.

19. The transmission of claim 18, wherein
the second differential comprises a ninth rotary element and the second motor/generator is connected to the ninth rotary element.

20. The transmission of claim 18, wherein
the first motor/generator and the second motor/generator are disposed coaxially.

21. The transmission of claim 20, wherein
the fifth rotary element of the first set of rotary element and a rotary element of the second set of rotary element are connected by a shaft that penetrates through the first motor/generator and the second motor/generator.

* * * * *